US011670118B2

(12) United States Patent
Serra et al.

(10) Patent No.: US 11,670,118 B2
(45) Date of Patent: *Jun. 6, 2023

(54) SENSORIZED BRAKE PAD CALIBRATION MACHINES, SYSTEMS, AND METHODS

(71) Applicant: ITT Italia S.r.l., Barge (IT)

(72) Inventors: Stefano Serra, San Vittore Olona (IT); Mattia Solari, Barge (IT); Laura Meduri, Barge (IT); Paolo Truccone, Barge (IT)

(73) Assignee: ITT Italia S.R.L., Barge (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/443,797

(22) Filed: Jul. 27, 2021

(65) Prior Publication Data

US 2022/0084324 A1 Mar. 17, 2022

Related U.S. Application Data

(63) Continuation of application No. 15/719,304, filed on Sep. 28, 2017, now Pat. No. 11,107,298.

(30) Foreign Application Priority Data

Jun. 29, 2017 (IT) .................. 102017000073192

(51) Int. Cl.
*G07C 5/00* (2006.01)
*G01M 17/04* (2006.01)
(Continued)

(52) U.S. Cl.
CPC ............ *G07C 5/008* (2013.01); *B60T 17/221* (2013.01); *F16D 65/04* (2013.01); *F16D 65/092* (2013.01);
(Continued)

(58) Field of Classification Search
CPC ...... B60T 17/221; F16D 65/04; F16D 66/021; F16D 2066/005; G01L 5/28; B60Y 2304/09; B60Y 2400/306
See application file for complete search history.

(56) References Cited

U.S. PATENT DOCUMENTS

| 7,398,669 B2 | 7/2008 | Mahajan et al. |
| 11,107,298 B2 | 8/2021 | Serra et al. |

(Continued)

FOREIGN PATENT DOCUMENTS

| CN | 101592631 | 12/2009 |
| CN | 201998448 U | 10/2011 |

(Continued)

OTHER PUBLICATIONS

International Search Report for PCT Application No. PCT/EP2018/0672178, dated Aug. 27, 2018 in 4 pages.

(Continued)

*Primary Examiner* — Manuel A Rivera Vargas
(74) *Attorney, Agent, or Firm* — Knobbe, Martens, Olson & Bear, LLP

(57) ABSTRACT

Various machines, systems, and methods for generating calibration data for a sensorized brake pad are disclosed. In some embodiments, a system includes a fixture, a brake pad retainer, a pressure plate, an actuator and a controller. The actuator applies a pressure to the sensorized brake pad and signals from the pressure sensors are received. Calibration data is generated based on the signals received from the pressures sensors when the pressure is applied to the sensorized brake pad.

20 Claims, 16 Drawing Sheets

(51) Int. Cl.
*B60T 17/22* (2006.01)
*G01L 5/00* (2006.01)
*F16D 65/092* (2006.01)
*F16D 69/00* (2006.01)
*F16D 65/04* (2006.01)
*F16D 66/02* (2006.01)
*G01L 5/28* (2006.01)
*G07C 5/08* (2006.01)
*F16D 66/00* (2006.01)

(52) U.S. Cl.
CPC ............ *F16D 66/021* (2013.01); *F16D 69/00* (2013.01); *G01L 5/0028* (2013.01); *G01L 5/28* (2013.01); *G01M 17/04* (2013.01); *G07C 5/0808* (2013.01); *B60Y 2304/09* (2013.01); *B60Y 2400/306* (2013.01); *B60Y 2410/111* (2013.01); *F16D 2066/005* (2013.01); *F16D 2066/006* (2013.01)

(56) References Cited

U.S. PATENT DOCUMENTS

| | | | |
|---|---|---|---|
| 2007/0068220 A1* | 3/2007 | Mahajan | G01N 19/02 73/9 |
| 2007/0144839 A1 | 6/2007 | Seksaria et al. | |
| 2008/0047787 A1 | 2/2008 | Scheckelhoff et al. | |
| 2010/0065389 A1 | 3/2010 | Gilboy et al. | |
| 2013/0262067 A1 | 10/2013 | Zhang et al. | |
| 2014/0069750 A1 | 3/2014 | Nohira et al. | |
| 2015/0330468 A1 | 11/2015 | Heren | |
| 2016/0084331 A1* | 3/2016 | Merlo | F16D 66/026 188/1.11 E |
| 2016/0153510 A1 | 6/2016 | Rothfuss et al. | |
| 2017/0159734 A1 | 6/2017 | Wagner | |
| 2018/0079403 A1 | 3/2018 | Masuda | |
| 2019/0005743 A1 | 1/2019 | Serra et al. | |

FOREIGN PATENT DOCUMENTS

| | | |
|---|---|---|
| CN | 203414349 U | 1/2014 |
| CN | 106733728 A | 5/2017 |
| KR | 100791632 B1 | 1/2008 |
| KR | 100856721 B1 | 9/2008 |
| WO | WO2014/170726 A1 | 10/2014 |

OTHER PUBLICATIONS

Written Opinion for PCT Application No. PCT/EP2018/0672178, in 7 pages.

IT Search Report (IT 201700073192, IO 74047); dated Mar. 23, 2018; 11 pages.

* cited by examiner

SENSORIZED BRAKE PAD CALIBRATION MACHINES, SYSTEMS, AND METHODS

CROSS REFERENCE

This application is a Continuation of U.S. patent application Ser. No. 15/719,304, filed Sep. 28, 2017, which claims the benefit under 35 U.S.C. § 119 of Italian Patent Application No. 102017000073192, filed Jun. 29, 2017, the entirety of which is incorporated by reference herein.

BACKGROUND

Field

The present disclosure relates to machines, systems, and methods for determining calibration data, such as for determining calibration data for a sensorized brake pad for use on a vehicle.

Description of Certain Related Art

A braking unit is a mechanical apparatus that diverts energy from a moving system, thereby reducing the motion of the moving system. A braking unit is typically used for slowing or stopping a moving vehicle, such as by friction between a generally non-rotating brake pad and a rotating brake disk or drum. The brake pad can be pressed against the brake disk or drum by a brake caliper.

SUMMARY OF CERTAIN FEATURES

Some braking units include sensorized brake pads. Typically, sensorized brake pads include sensors, such as pressure sensors. This can enable the brake pad to detect and/or measure the pressure and forces applied to the brake pad while it is installed on the vehicle. Sensorized brake pads can allow the vehicle to detect conditions that may cause abnormal wear, noise and/or vibration.

Due to manufacturing variances in the sensors and/or the brake pad, the signal outputs from the sensors may vary slightly between identically manufactured brake pads. In some configurations, to accommodate for the variance between identically manufactured brake pads, the vehicle is provided with calibration data in order to calibrate the vehicle to the installed brake pads such that the vehicle may accurately interpret the signal outputs from the sensors. A need exists for determining calibration data for each brake pad and for the providing and use of such data.

Various embodiments disclosed herein relate to a machine for determining calibration data for a sensorized brake pad. The sensorized brake pad can include pressure sensors that are configured to detect pressure applied to friction material of the sensorized brake pad. The machine can include a fixture. The machine can include a brake pad retainer. The retainer can be supported by the fixture and configured to hold the sensorized brake pad fixed relative to the fixture. The machine can include a pressure plate. The pressure plate can be configured to contact the friction material of the sensorized brake pad. The machine can include an actuator. The actuator can be supported by the fixture at a first end and connected to the pressure plate at a second end.

The machine can include a controller. The controller can have an actuator control portion configured to control the actuator. The actuator control portion can direct the actuator to apply a pressure to the pressure plate such that the sensorized brake pad is compressed between the pressure plate and the brake pad retainer. The controller can have a pressure sensor signal receiving portion. The pressure sensor signal receiving portion can be configured to receive the signals from the pressure sensors when the pressure is applied to the sensorized brake pad. The controller can have a calibration data generator that is configured to generate calibration data, such as based on the signals received from the pressure sensors when the pressure is applied to the sensorized brake pad.

In some embodiments, the actuator is positioned at an angle relative to a rotor-contacting surface such that pressure applied to the sensorized brake pad includes a normal force component and a shear (also called tangential) force component. In some embodiments, the angle is adjustable. In some embodiments, the angle is adjustable preferably within a range of 50-80 degrees.

In certain embodiments, the machine further comprises a plurality of actuators connected to the pressure plate and configured to apply pressure to the pressure plate, wherein a normal force actuator is configured to apply a normal force component and a shear force actuator is configured to apply a shear force component. In some embodiments, the machine further comprises a bearing that connects the normal force actuator and the pressure plate. In some embodiments, the actuator control portion applies a plurality of pressures of varying magnitude to the sensorized brake pad. In some embodiments, the plurality of pressures range in magnitude between 1-150 bars.

In certain embodiments, the machine further comprises a measurement system configured to measure a distance related to the thickness of the brake pad when the pressure is applied to the sensorized brake pad. In some embodiments, the measurement system comprises a laser distance sensor. In some embodiments, the controller further comprises: a distance signal receiving portion configured to receive distance signals from the measurement system; and a compressibility data generator configured to generate compressibility data based on the distance signals received from the measurement system, and to determine whether the compressibility data is within predetermined maximum and minimum compressibility limits.

Some embodiments disclosed herein relate to a method for determining calibration data for a sensorized brake pad that comprises pressure sensors configured to output signals in response to pressure applied to the sensorized brake pad. The method comprises retaining the sensorized brake pad in a fixture in a calibration machine; applying, with an actuator of the calibration machine, pressure to the sensorized brake pad; receiving signals outputted from the pressure sensors while the pressure is being applied to the sensorized brake pad; determining calibration data for the sensorized brake pad based on the signals; storing the calibration data into a memory; and providing the calibration data to a user for installing in a controller of a vehicle on which the sensorized brake pad is installed.

In some embodiments, the applying of pressure further comprises applying the pressure at a substantially 90 degree angle relative to the friction element of the sensorized brake pad. In some embodiments, the applying of pressure comprises applying a normal force and a shear force to the sensorized brake pad. In some embodiments, the storing of the calibration data into memory further comprises storing the calibration data into memory on-board the sensorized brake pad.

In some embodiments, the method further comprises associating an optical code with the calibration data of the sensorized brake pad, and providing the optical code with the brake pad. In some embodiments, the optical code comprises a QR code. In some embodiments, the method further comprises receiving a request for the calibration data of the brake pad in response to scanning of the optical code.

Some embodiments disclosed herein relate to a method of calibrating a braking system on a vehicle. The method comprises identifying a brake pad by referencing a brake pad identifier provided on or with the brake pad; installing the brake pad on the vehicle; receiving calibration data corresponding to the brake pad identified by the brake pad identifier; and uploading the calibration data to a processing unit of the vehicle.

In some embodiments, the brake pad identifier comprises a code that is unique to each brake pad.

In some embodiments, the brake pad identifier comprises an alpha-numeric, a machine-readable, or an electronic code.

In some embodiments, identifying a brake pad further comprises scanning the code with a code scanner.

In some embodiments, scanning the code with the code scanner generates a request to receive the calibration data from a database containing the calibration data.

In some embodiments, receiving calibration data further comprises receiving the calibration data via internet communication.

Certain embodiments include a measuring system. The measuring system can be configured to measure a relative variation of distance. For example, in some embodiments, the measuring system can measure a variation of distance between the measuring system and a base plane of the fixture of the calibration machine holding the pad during the calibration. In various embodiments, the measuring system can enable measurement of the compression of the friction material when a pressure is applied to the pad. The measurement system can be included in the calibration machine or separate. In various embodiments, the measurement system can enable in-line (e.g., in the manufacturing line) compressibility testing of each brake pad.

The devices, systems, and methods described herein have several innovative aspects, no single one of which is indispensable or solely responsible for their desirable attributes. Neither the Summary above, nor the Detailed Description below, nor the associated drawings, should be interpreted to limit the scope of the claims.

BRIEF DESCRIPTION OF THE DRAWINGS

Various embodiments are depicted in the accompanying drawings for illustrative purposes, and should in no way be interpreted as limiting the scope of this disclosure. Various features of different disclosed embodiments can be combined to form additional embodiments, which are part of this disclosure.

DETAILED DESCRIPTION OF CERTAIN EMBODIMENTS

Figure 1A:
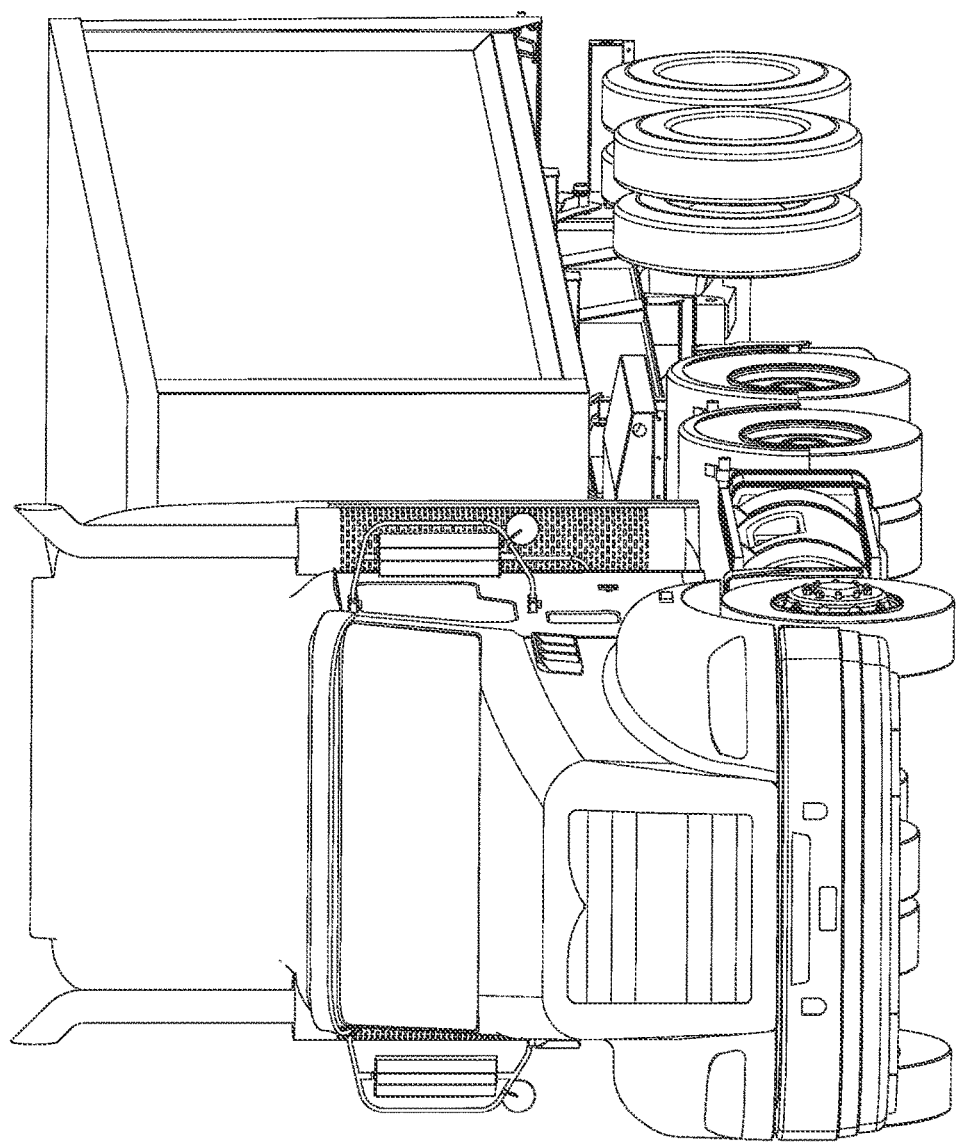
FIG. 1A illustrates a perspective view of a vehicle.

In the following detailed description, reference is made to the accompanying drawings, which form a part hereof. In the drawings, similar reference numbers typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. The aspects of the present disclosure, as generally described herein, and illustrated in the figures, may be arranged, substituted, combined, and designed in a wide variety of different configurations, all of which are explicitly contemplated and made a part of this disclosure.

Overview

FIG. 1A illustrates a vehicle V, such as a heavy truck. The vehicle can include a sensorized braking system 10, such as in one or more of the wheels. The sensorized braking system 10 can aid in braking the vehicle.

Figure 1B:
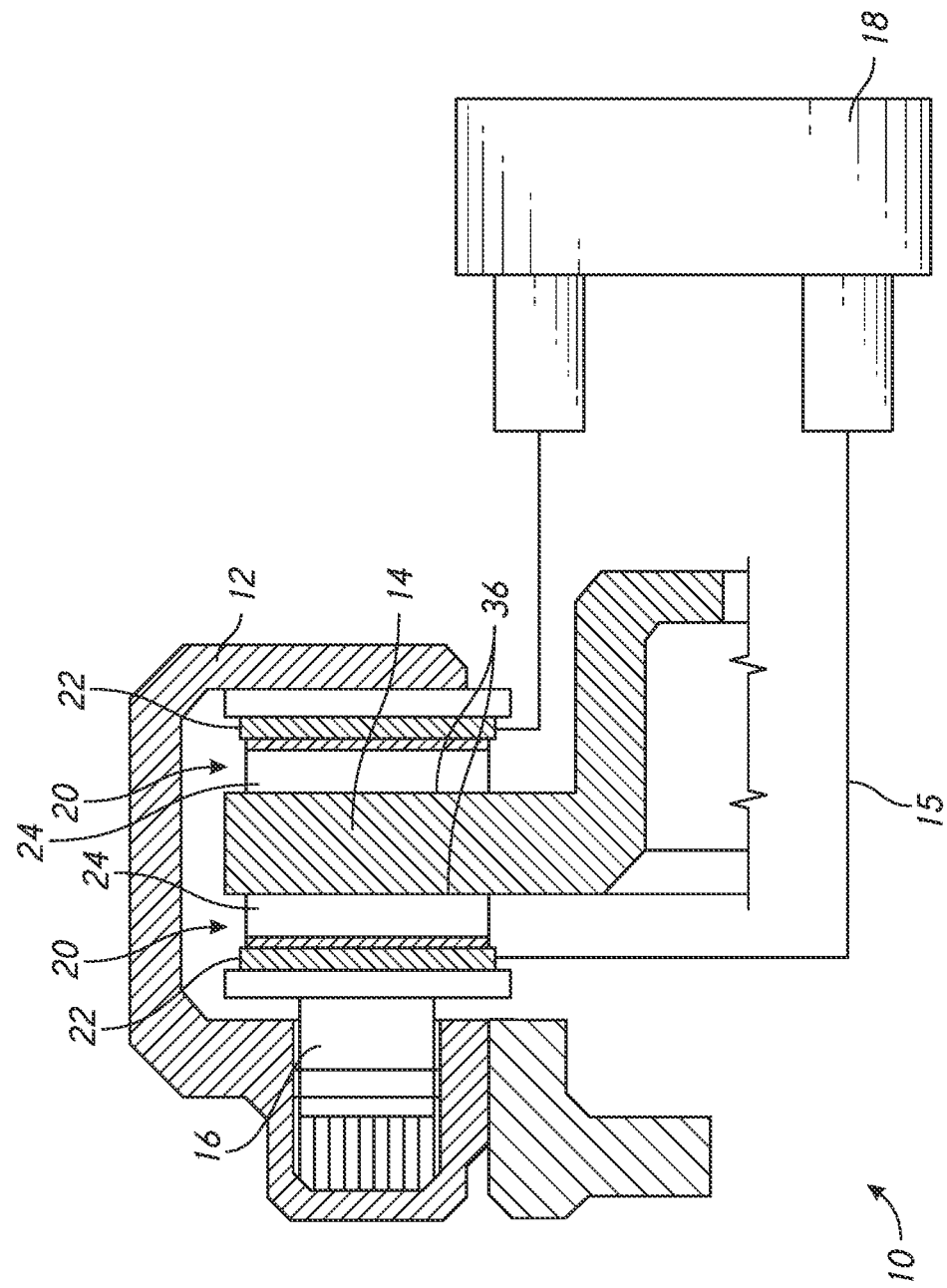
FIG. 1B illustrates a schematic view of a sensorized braking system installed on a vehicle.

FIG. 1B schematically illustrates the sensorized braking system 10. As shown, the system 10 includes a caliper 12 and disk-shaped rotor 14 rotating about an axis of the wheel of the vehicle. A pair of sensorized brake pads 20 is installed within a brake caliper 12 that is installed on the vehicle. The brake caliper 12 is installed over a brake rotor 14 of the vehicle such that the sensorized brake pads 20 are positioned on opposing sides of the brake rotor 14. The caliper 12 includes pistons 16 that engage the respective brake pads 20. In response to a brake command (such as when the driver of the vehicle applies the brakes), the pistons 16 press each brake pad 20 against the brake rotor 14. More specifically, the brake rotor contacting surfaces 36 of the friction material 24 contact opposing faces of the brake rotor 14 such that the brake rotor 14 is clamped by the brake pads 20. Friction between the rotor 14 and the brake pads 20 slow the rotation of the brake rotor 14.

Figure 2A:
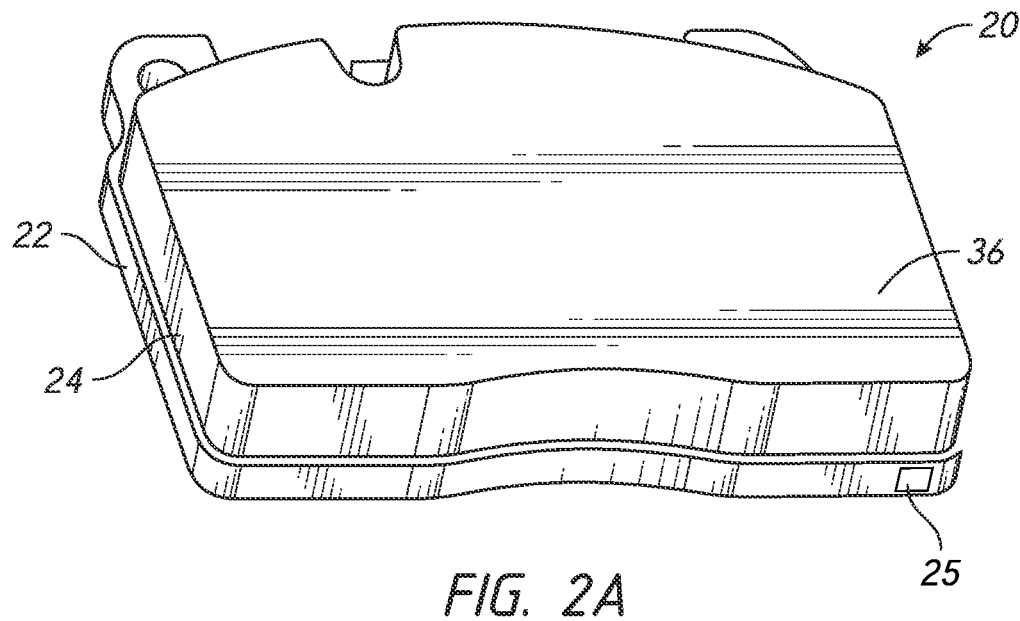
FIG. 2A illustrates a perspective view of a sensorized brake pad.
Figure 2B:
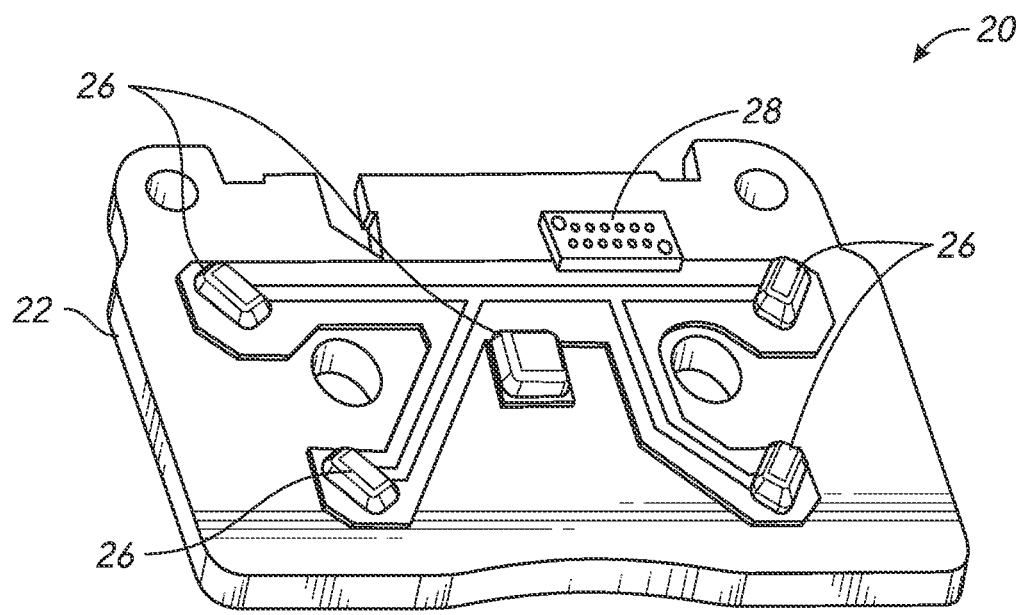
FIG. 2B illustrates a perspective view of the sensorized brake pad in FIG. 2A with the friction material removed to illustrate certain internal features.

FIGS. 2A and 2B illustrate an embodiment of the sensorized brake pad 20. As shown, the sensorized brake pad 20 comprises a backing plate 22, a friction material 24, and one or more pressure sensors 26. In some embodiments, the sensorized brake pad 20 includes an identifier 25, such as an optical code. The friction material 24 can be formed on the backing plate 22 and the pressure sensors 26 are embedded within the friction material 24.

The pressure sensors 26 can be configured to sense the braking force and pressure (e.g., in terms of normal and/or shear forces) applied to the friction material 24. For example, the pressure sensors 26 can detect the force applied by the brake rotor 14 when the brake pad 20 is pressed against the brake rotor 14 during a brake application. The pressure sensors 26 generate electrical signals. The signals can be transmitted via cables 15 to a processing unit 18 installed on the vehicle (See FIG. 1B). In some configurations, the processing unit 18 may be and/or be integrated into the vehicle electronic control unit (ECU) or a brake control unit. The processing unit 18 can be configured to receive and process the electrical signals from the pressure sensors 26 of the brake pad 20. In some embodiments, the processing unit 18 is configured to determine the amount of normal and/or shear forces being applied to the friction material 24 of the brake pad 20.

In some embodiments, by determining the amount of normal and/or shear forces acting on the brake pad 20, the processing unit 18 is capable of monitoring the vehicle braking system. For example, the sensorized braking system 10 can allow for the detecting of conditions that indicate both normal and abnormal operation of the braking system. Some variants of the sensorized braking system 10 may detect the occurrence of abnormalities such as increased wear, noise and/or vibration. Some embodiments of the sensorized braking system 10 can detect whether the brake pads 20 are contacting the brake rotor 14 and the amount of pressure being applied to the brake rotor 14. Certain implementations of the sensorized braking system 10 may detect uneven braking between left- and right-side calipers, dragging of the brake pad 20, vibration of the brake pad 20 within the caliper 12, and/or other abnormalities.

During the manufacturing of sensorized brake pads 20, variances in the construction of the pressure sensors and/or the brake pads may cause slight variance in the signal outputs of generally identically constructed pressure sensors 26. The signal output between substantially identically constructed pressure sensors 26 may vary, such as due to manufacturing variance. For further illustration of the effect of manufacturing variance, Table 1 is provided below.

Table 1 shows the pressure sensor outputs for three substantially identically manufactured sample brake pads (Sample 1, Sample 2, Sample 3) at applied pressures of 5, 53.3, 101.6 and 150 bars. As shown, the voltage outputs for normal and shear forces vary between the three pressure sensors for a given applied pressure. As a result, depending on the amount of variance, the processing unit 18 of the vehicle may not accurately detect the actual pressures on the brake pad 20 when installed on the vehicle. Thus, it can be desirable to provide a calibration system to identify and/or compensate for variability in the brake pad 20.

Using a Sensorized Brake Pad

Figure 3:
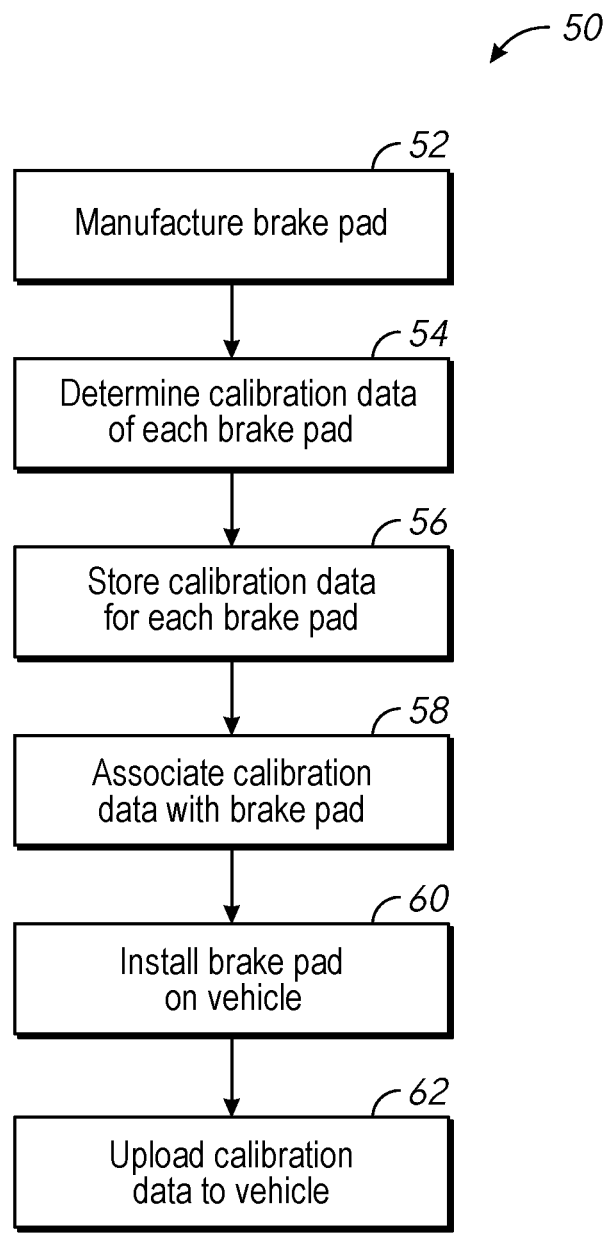
FIG. 3 is a flowchart illustrating steps from the manufacturing of the sensorized brake pad to the calibration of the vehicle with the sensorized brake pad installed.

FIG. 3 illustrates a process 50 of using (e.g., obtaining, providing, installing, etc.) the sensorized brake pad 20. In some embodiments, the process 50 includes certain actions between the manufacture of the sensorized brake pad 20 and a vehicle with the sensorized brake pad 20 installed being configured to use the sensorized brake pad 20.

As shown in block 52, in some embodiments, the sensorized brake pad 20 is manufactured. For example, the sensorized brake pad 20 is produced on an automated assembly line. Further details related to the manufacture and other aspects of the sensorized brake pad 20 are described in U.S. Pat. No. 9,415,757, which is incorporated herein by reference in its entirety.

In some embodiments, the process 50 includes the use of a calibration machine. The calibration machine can be configured to perform a calibration data determining process. For example, in block 54, the calibration machine performs a calibration data determining process on each sensorized brake pad to determine calibration data for each sensorized brake pad. In some embodiments, the calibration data comprises a plurality of points (e.g., pressures and associated voltage readings). In some variants, the calibration data comprises a mathematical function, such as a formula for a line or curve that includes the plurality of points. The mathematical function can be used operatively as specific values for coefficients belonging to those mathematical formula obtained through a best-fit procedure. In some embodiments, the calibration data is used to determine a polynomial, such as a line. Certain implementations determine the polynomial with a linear, quadratic, cubic or other type of regression analysis. In some embodiments, the calibration data comprises the polynomial and/or the coefficients of the polynomial. For example, in some variants, the calibration data comprises the slope and/or y-intercept of a line. The calibration data determining process may be performed shortly or immediately following the final step of manufacturing of the brake pad 20. In certain implementations, the calibration data can aid in accommodating manufacturing variance and/or varying outputs of the pressure sensors. In some embodiments, the calibration machine can be configured to determine calibration data specific to each sensorized brake pad such that the pressure sensing characteristics of the brake pad is defined by and/or associated with

TABLE 1

| Applied Pressure (bars) | Sample 1 - Normal (mV) | Sample 2 - Normal (mV) | Sample 3 - Normal (mV) | Sample 1 - Shear (mV) | Sample 2 - Shear (mV) | Sample 3 - Shear (mV) |
|---|---|---|---|---|---|---|
| 5 | 14 | 15 | 17 | 4 | 5 | 7 |
| 53.3 | 22 | 25 | 30 | 8 | 10 | 12 |
| 101.6 | 50 | 55 | 55 | 22 | 25 | 30 |
| 150 | 75 | 80 | 85 | 35 | 40 | 45 | the calibration data. The calibration machine and calibration data determining process will be described in further detail below.

In block 56, the calibration data (e.g., the calibration coefficients obtained during the pad calibration) for each sensorized brake pad 20 is stored. For example, the data can be stored in a database. In block 58, the calibration data (e.g., the coefficients) for a particular sensorized brake pad 20 can be associated with that sensorized brake pad 20. For example, the particular calibration data for a given sensorized brake pad 20 can be associated with a unique identifier for that sensorized brake pad 20. In various embodiments, the unique identifier of a particular sensorized brake pad 20 can be used to link (e.g., map) that particular sensorized brake pad 20 with its calibration data and/or data location. Examples are shown below in Tables 2 (calibration data comprises voltages at various pressures and/or torques) and 3 (calibration data comprises the calibration coefficient):

TABLE 2

| Identifier | Calibration Data | |
|---|---|---|
| ABC123 | Pressure (Bar) | SP (V) |
| | 5.72 | 1.69E−02 |
| | 10.89 | 3.41E−02 |
| | 16.08 | 4.80E−02 |
| | 21.18 | 6.31E−02 |
| | 31.25 | 9.59E−02 |
| | 21.19 | 6.31E−02 |
| | 41.20 | 1.28E−01 |
| | 51.00 | 1.62E−01 |
| | 60.93 | 1.94E−01 |
| DEF456 | Torque (daNm) | SP (V) |
| | 25.47 | 8.54E−03 |
| | 42.61303711 | 1.81E−02 |
| | 62.31863403 | 3.05E−02 |
| | 81.36339722 | 4.37E−02 |
| | 118.24 | 7.31E−02 |
| | 84.63253174 | 4.62E−02 |
| | 157.2422607 | 1.05E−01 |
| | 198.3201477 | 1.45E−01 |
| | 238.9833069 | 1.85E−01 |
| GHI789 | Pressure_Dyno (Bar) | SP (V) |
| | 5.63 | 2.02E−02 |
| | 10.82 | 3.99E−02 |
| | 16.04 | 5.42E−02 |
| | 21.16 | 6.91E−02 |
| | 31.22 | 1.03E−01 |
| | 21.18 | 6.86E−02 |
| | 41.20 | 1.35E−01 |
| | 51.06 | 1.70E−01 |
| | 60.91 | 2.04E−01 |

TABLE 3

| Identifier | Calibration Data |
|---|---|
| ABC123 | Linear Coefficient: 318.96 |
| DEF456 | Linear Coefficient = 809.43, Power coefficient = 0.7312 |
| GHI789 | Linear Coefficient: 300.86 |

In block 60, the sensorized brake pad 20 is installed on a vehicle, such as by being assembled into the braking unit 10. In certain implementations, the sensorized brake pad 20 that is installed on the vehicle is identified and the calibration data for that sensorized brake pad 20 is identified and/or provided. In certain embodiments, the calibration data stored in the database is cross-referenced and/or linked to the sensorized brake pad 20 that is installed on the vehicle such that the calibration data specific to the sensorized brake pad 20 may be installed to the processing unit 18 of the vehicle.

In block 62, the processing unit 18 of the vehicle on which the sensorized brake pads 20 are installed is provided (e.g., uploaded) with the calibration data. For example, in some configurations, the calibration data may be requested in response once identified and cross-referenced in block 60. In some embodiments, the request may cause the calibration data to be downloaded and/or received by the processing unit 18 via the internet. The data may be requested, provided and/or downloaded to the processing unit 18 via a wired or wireless communication system. For example, the installer may connect the processing unit 18 to a computer, diagnostic tool or memory storage device which uploads the calibration data to the processing unit 18. In some embodiments, the processing unit 18 may download the calibration data without an installer and wirelessly via over-the-air software updates. In certain configurations, the calibration data stored in the on-board memory of the brake pad 20 is uploaded to the processing unit 18. The processing unit 18 can receive the calibration data and the braking system of the vehicle can be calibrated with the sensorized brake pads 20 that are installed on the vehicle. In various embodiments, the processing unit 18 may use the calibration data to facilitate accurate interpreting of the output signals from the pressure sensors and/or determining the amount of pressure applied on the brake pads 20.

Associating a Particular Brake Pad with its Calibration Data

As mentioned above, calibration data (e.g., coefficients) can be associated with the sensorized brake pad 20. In some embodiments, the sensorized brake pad 20 may be identified by an identifier provided on and/or with the brake pad 20. In some variants, the identifier can be used to link the sensorized brake pad 20 with its associated calibration data. In some embodiments, the identifier may be used to search the database for the corresponding calibration data specific to the sensorized brake pad 20 installed on the vehicle. The identifier may be used to request the calibration data of the brake pad 20 and the processing unit 18 may be provided with the corresponding calibration data (e.g., as shown in block 62 of FIG. 3). In some embodiments, the identifier may be provided with the sensorized brake pad 20, such as on a box containing the sensorized brake pad 20 or documentation provided with the sensorized brake pad 20.

In some implementations, the identifier may be an alphanumeric code that is provided (e.g., engraved, stamped, printed, labeled, etc.) on the sensorized brake pad 20, such as on the backing plate 22. Each sensorized brake pad 20 may have a unique identifier. In some embodiments, the code may be provided to a computer or diagnostic tool which requests, retrieves and uploads the calibration data to the vehicle. In certain embodiments, the vehicle may prompt the installer for the code such that the vehicle may retrieve the calibration data for the brake pad 20. In other embodiments, the processing unit 18 may be provided with the identifier such that the processing unit 18 automatically retrieves the calibration data via over-the-air communication. In some variants, the identifier may be a machine-readable code. For example, the identifier can include an optical code, such as a bar code, Quick Response (QR) code, etc. The identifier can be provided on and/or with the sensorized brake pad 20. The identifier may be scanned (e.g., via a scanner, reader and/or camera) to identify the sensorized brake pad 20. In some embodiments, the code may be used to access and/or search the database to identify and/or provide the calibration data specific to the sensorized brake pad 20. In some embodiments, a request for the calibration data of the brake pad 20 may be generated in response to scanning of the identifier.

In some embodiments, the identifier may be an electronic tag such as an RFID chip that is provided on and/or with the sensorized brake pad 20. The electronic tag may be sensed by a tag reader vehicle such that the sensorized brake pad 20 installed on the vehicle is identified and the corresponding calibration data is provided to the vehicle. In some embodiments, the vehicle may be equipped with a tag reader such that the vehicle may automatically identify and obtain the calibration data specific to the sensorized brake pad 20.

In certain embodiments, the identifier may be comprised of electronic data stored in on-board memory of the brake pad 20. The electronic data may be read by the processing unit 18 such that the sensorized brake pad 20 installed on the vehicle is identified and the corresponding calibration data is obtained by the vehicle. In some embodiments, the calibration data may be stored in the on-board memory of the brake pad 20 such that the processing unit 18 receives, recognizes and calibrates the braking system according to the calibration data stored in on-board memory of the brake pad 20.

Example Calibration Machine

Figure 4A:
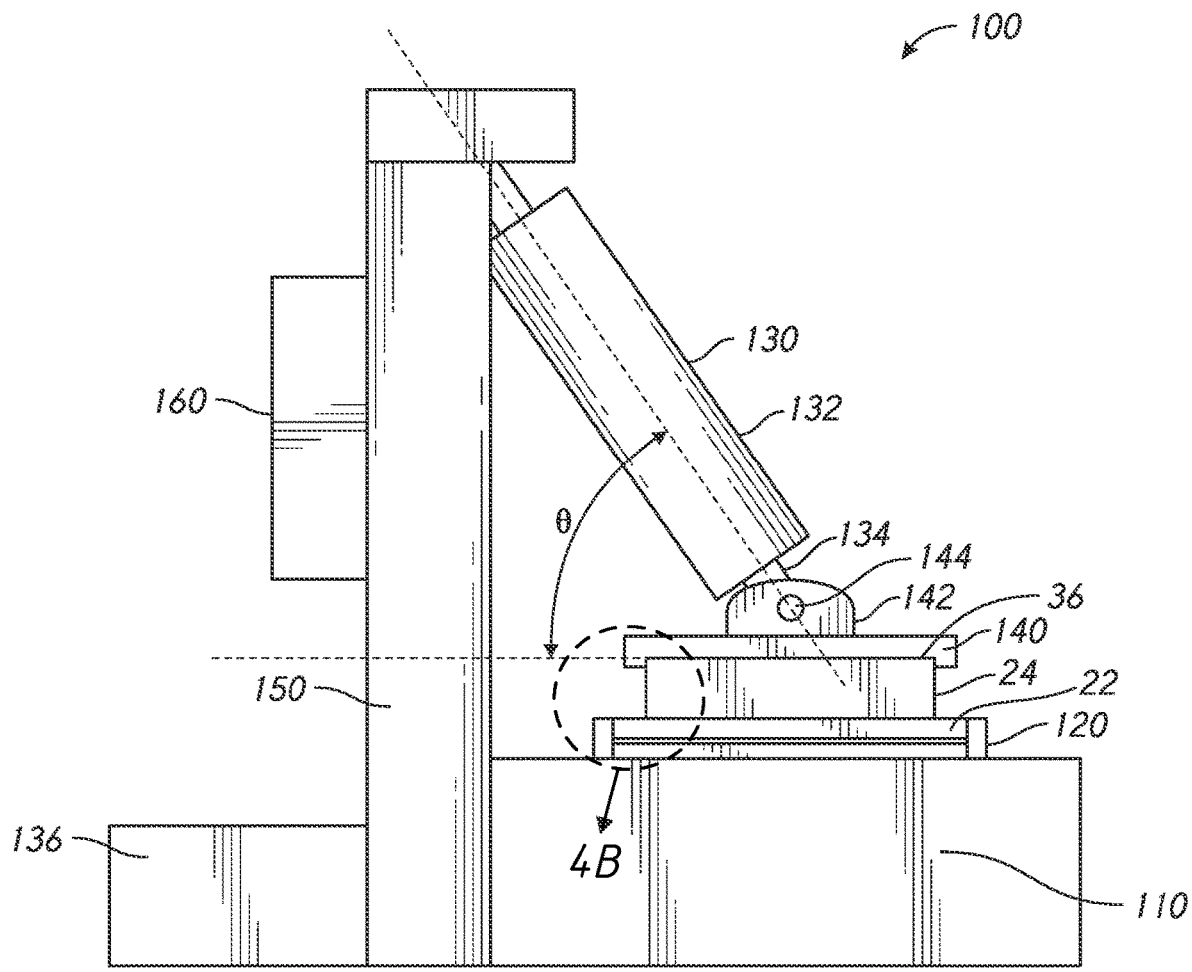
FIG. 4A illustrates a side view of an embodiment of the calibration machine.

FIG. 4A shows the mechanical structure of the calibration machine 100. The calibration machine 100 comprises a fixture or base 110, a brake pad retainer 120, an actuator 130, a pressure plate 140, a support column 150 and a controller 160. As will be described in further detail below, during the calibration data determining process 200, the calibration machine 100 applies a load to the sensorized brake pad 20 in a manner that simulates (e.g., is substantially identical) to the loading that the brake pad 20 experiences when installed on the vehicle and the brakes are applied. Applying pressure to the brake pad 20 in such a manner helps ensure that the outputs of the pressure sensors can be accurately associated with the loading when installed on the vehicle. In the illustrated configuration, the calibration machine 100 is configured to apply pressures of about 5 bars to about 150 bars to the brake pad 20.

Base Fixture

The base 110 is comprised of a rigid fixture that provides stability and support when operating the calibration machine 100. During the calibration data determining process 200, the braking pad 20 will be compressed at sustained pressures, such as between 5 bars to 150 bars while pressure and distance measurements are recorded. Therefore, it is preferable that the base 110 has a mass, shape, geometry, construction, etc. to provide the calibration machine 100 with mechanical strength and a rigid foundation to avoid displacement, deformation and/or instability when pressure is applied to the brake pads 20 during the calibration data determining process 200. Preferably, the base 110 is formed from a metal, such as cast iron, stainless steel, etc.

Brake Pad Retainer

FIG. 5 illustrates the brake pad retainer 120. The brake pad retainer 120 retains and secures the braking pad 20 in a fixed position during operation of the calibration machine 100. The brake pad retainer 120 can be configured to hold the braking pad 20 fixed when normal and shear forces are applied to the friction material 24 of the braking pad 20. The brake pad retainer 120 may have a cavity 122 that is recessed from a surface of the brake pad retainer 120. The braking pad 20 is inserted into and received by the cavity 122. In some embodiments, the cavity 122 has a shape, depth and/or geometry that generally corresponds to the shape, thickness and/or geometry of the backing plate 22 of the brake pad 20. The cavity 122 can have a configuration such that the backing plate 22 may fit snugly in the cavity 122 and/or such that the brake pad 20 is generally fixed relative to the cavity 122 when shear forces are applied to the brake pad 20. The brake pad 20 can be retained within the brake pad retainer 120 such that the brake pad 20 does not slip (e.g., move more than 5 mm) when shear forces are applied to the brake pad 20. Slipping or movement of the brake pad 20 relative to the brake pad retainer 120 may cause inaccuracies in the calibration data determining process 200 due to incomplete transmission or transfer of the pressures to the brake pad 20. In some embodiments, a smaller amount of pressure may be transferred to the brake pad 20 causing inaccurate determination of calibration data. Inhibiting or preventing slippage can be a safety feature, such as to reduce the chance of a brake pad under load sliding out of the calibration machine 100 at a high rate of speed.

In some configurations, the cavity 122 may have a depth of between 3-5 mm, which may be similar or equal to the thickness of the backing plate 22. Preferably, the cavity 122 has a depth of at least 3-4 mm. In some configurations, the shape, depth and/or geometry of the cavity 122 may vary such that the brake pad 20 may be quickly removed and inserted into the brake pad retainer 120 while being sufficiently stable during calibration operations. For example, the leading edges (e.g., upper corners) of the cavity 122 may be chamfered or filleted.

In some configurations, brake pad retaining elements (not shown) may be formed within the cavity 122 or on a surface of the brake pad retainer 120 which may mechanically hold and/or inhibit slippage of the brake pad 20 within the cavity 122 during the calibration data determining process 200. For example, the bottom or sidewalls of the cavity 122 may have features that protrude and/or recess into the cavity 122. The brake pad retaining elements may engage corresponding features in the backing plate 22 of the brake pad 20 (e.g., tabs, holes, slots, notches, cut-outs, grooves, etc.) such that the brake pad 20 is secured to the brake pad retainer 120. In some variants, the brake pad 20 is secured in the brake pad retainer 120 in a manner that is substantially similar to the manner in which the brake pad 20 is secured to the brake caliper 12 in the vehicle. For example, the brake pad retaining elements on the brake pad retainer 120 may be substantially similar to the brake pad retainer 120 with which the brake pad 20 is secured to the brake caliper 12 in the vehicle. In some configurations, the brake pad retainer 120 may be configured without a cavity 122 such that the brake pad retaining elements are positioned on a surface of the brake pad retainer 120. In certain configurations, the brake pad retaining elements secure the brake pad 20 to the brake pad retainer 120 and prevent the brake pad 20 from slipping during the calibration data determining process 200. In some configurations, the brake pad retainer 120 may comprise any structure for holding or locking the brake pad 20 fixed during the application of pressure during the calibration data determining process 200.

The brake pad retainer 120 may have a mass, shape, geometry, construction, etc. in order to provide mechanical strength and a rigid foundation to avoid any displacement, deformation or instability of the brake pad retainer 120 when pressure is applied to the brake pads 20. Preferably, the brake pad retainer 120 is formed from a stainless steel plate. In some configurations, the brake pad retainer 120 may have handles 124 positioned on the brake pad retainer 120 to allow a user to conveniently grab and hold the brake pad retainer 120, for example, during removal and installation of the brake pad retainer 120.

The brake pad retainer 120 may be fixed to the base 110 by fasteners (not shown) or other fastening arrangements. The fasteners may include nuts and bolts that are configured to allow the brake pad retainer 120 to be removably fastened to the base 110 while securely fastening the brake pad retainer 120 to the base 110. The fasteners can be configured to withstand the pressures applied to the brake pad retainer 120 without deforming or failing, such as for at least one million duty cycles. In some configurations, the fasteners may have a quick-release arrangement such that the brake pad retainer 120 may be quickly removed and replaced, for example, when transitioning a production line between different models or types of brake pads. For example, the calibration machine 100 may utilize different brake pad retainers 120 for different models or types of brake pads 20. Accordingly, the quick release fastener system may allow quick replacement of the brake pad retainer 120 between calibration runs of different types of brake pads 20 and/or when a brake pad retainer 120 is worn.

Figure 5A:
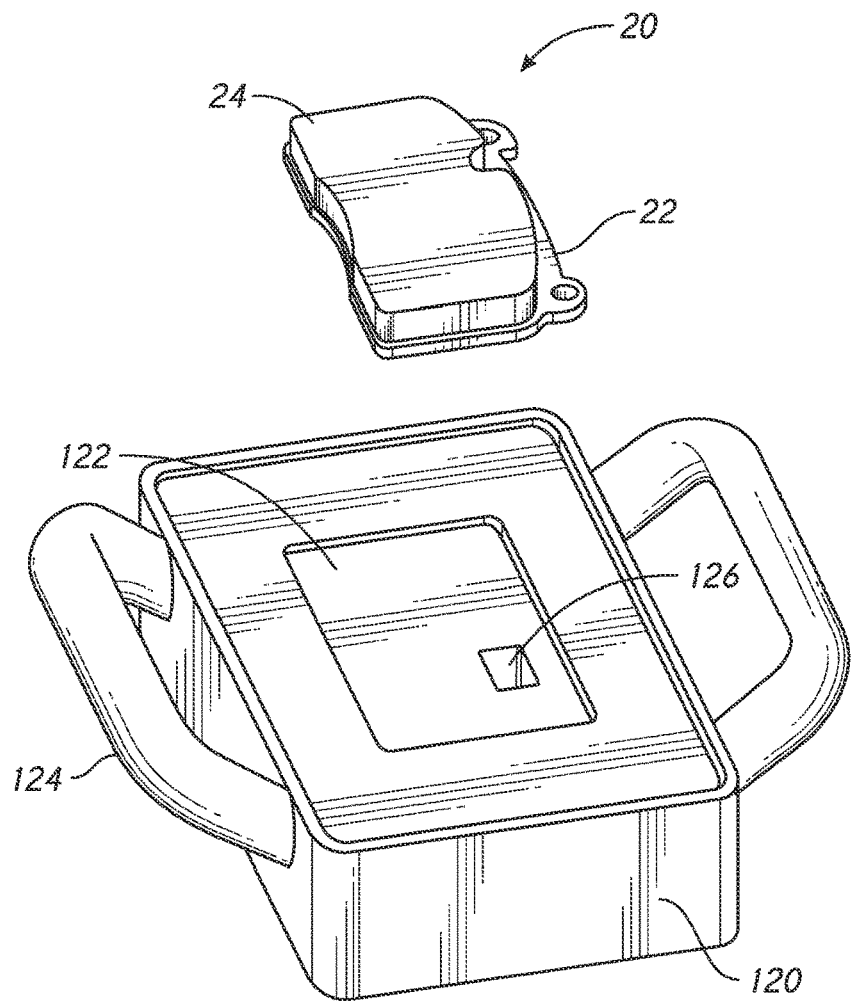
FIG. 5A illustrates an exploded view of a brake pad, retainer, and connector that can be used in and/or a part of the calibration machine of FIG. 4A.
Figure 5A:
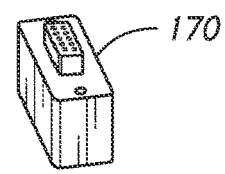
Figure 5B:
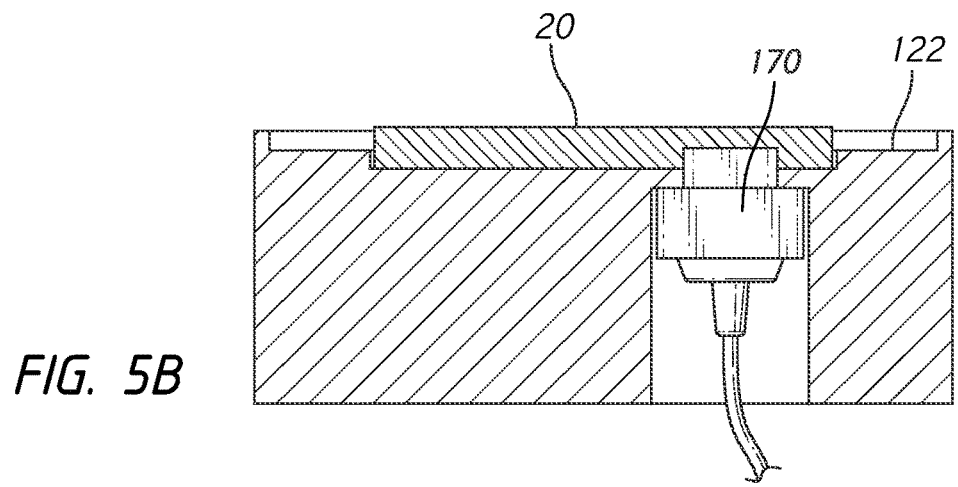
FIG. 5B schematically illustrates a side view of the brake pad, retainer, and connector of FIG. 5A in an engaged state.

As illustrated in FIGS. 5A and 5B, the machine 100 can be configured to engage with the brake pad 20. In some embodiments, the brake pad retainer 120 has a connector hole 126. A connector 170 of the calibration machine 100 can extend through the hole 126 to connect to the connector 28 of the brake pad 20, as illustrated in FIG. 5B. Connecting the connectors 28, 170 electrically connects the pressure sensors 26 of the brake pad 20 to the calibration machine 100. This can enable the electrical signals from the pressure sensors 26 to be received, recognized and/or read by the controller 160 of the calibration machine 100. The connectors 28, 170 may have a male-female arrangement with a corresponding shape and configuration. The connector 170 of the calibration machine 100 may have a shape and configuration that corresponds to the connector on a vehicle that connects to the connector 28 of the brake pad 20. The connectors 28, 170 may have a corresponding pin and electrode layout. The controller 160 of the calibration machine 100 may receive similar information (e.g., electrical signals) from the brake pad 20 that the processing unit 18 of the vehicle would receive when connected to the brake pad 20.

Figure 5C:
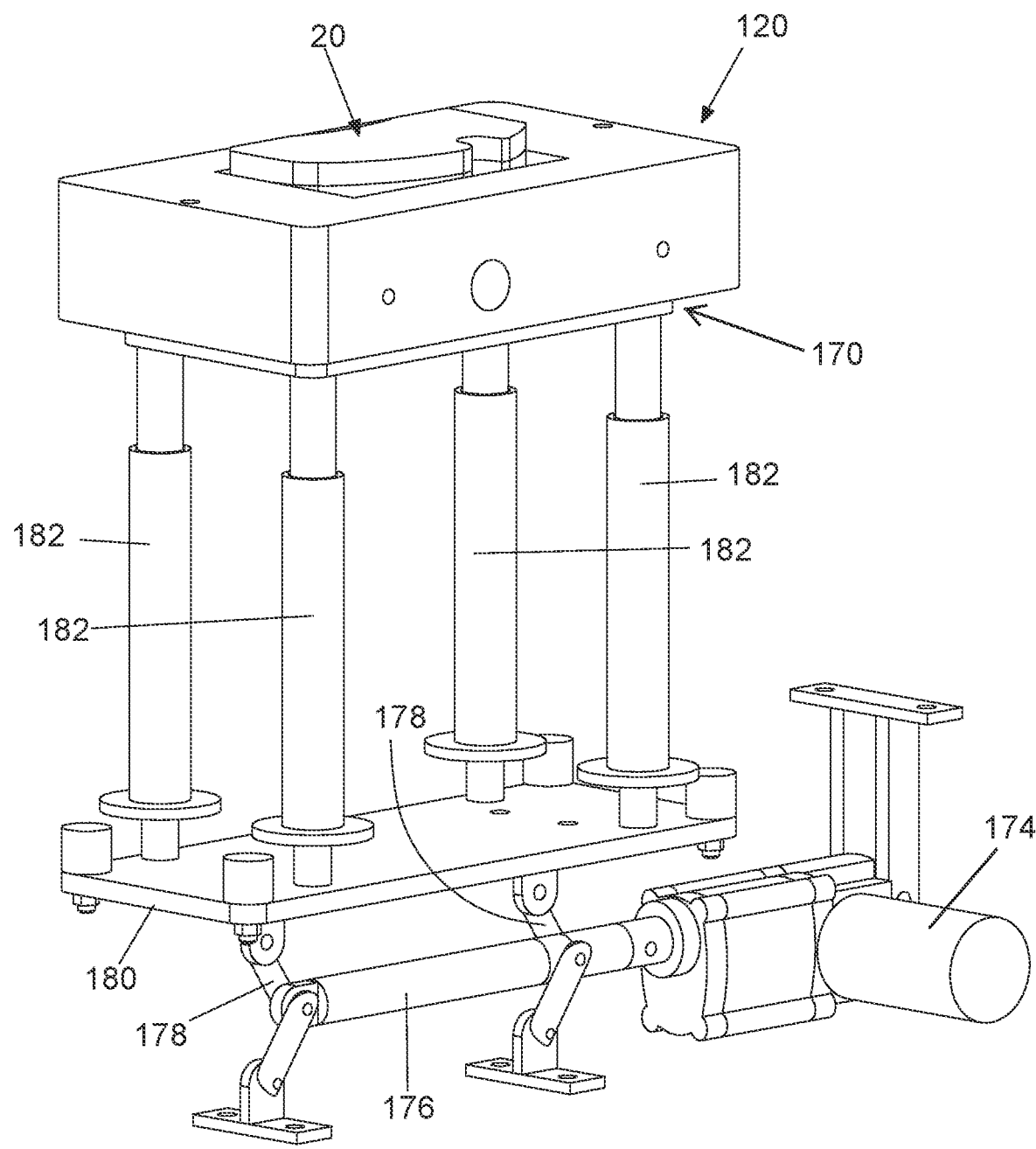
FIG. 5C illustrates a perspective view of an engagement system comprising the connector of FIG. 5A.

Some embodiments include a system that is configured to engage the connector 170 with the brake pad 20. For example, as shown in FIG. 5C, the system can be configured to extend and retract (e.g., raise and lower) the connector 170 into and out of engagement with the brake pad 20. As shown, the system can include an actuator 174, such as a motor, that drives a translating shaft 176. The shaft 176 can be coupled with connecting rods 178 to a plate 180. In some embodiments, when the shaft 176 translates in one direction the connector 170 is extended into engagement with the brake pad 20, and when the shaft 176 translates in the generally opposite direction the connector 170 is retracted out of engagement with the brake pad 20. As shown, the system can include one or more shock absorbers 182. In some embodiments, the shock absorbers 182 cushion and/or dampen the engagement of the connector 170 with the brake pad 20. In some embodiments, the shock absorbers 182 enable the connector 170 to rotate relative to the brake pad 20. This can facilitate engaging the connector 170 with the brake pad 20 and/or can reduce the chance of bending the contact (e.g., pins) of the connector 170.

In some configurations, the connector 170 may be connected to the controller 160 by a cable. In some configurations, the cable may have a length of at least 1-2 meters. In some configurations (e.g., for some configurations with five piezoceramic sensors and one temperature sensor), the connector 170 may comprise a 12-pin connector that is compatible with the ECU of the vehicle. The cable may provide signal transmission of at least 12 wires (e.g., equivalent to the number of pins). In some configurations, the controller 160 may communicate wirelessly with the brake pad 20. In certain configurations, each brake pad 20 is equipped with a wireless transceiver.

In some configurations, the connectors 28, 170 may be connected manually by a user, for example, when the user manually inserts the brake pad 20 into the cavity 122 by hand. In some configurations, the cavity 122 and connectors 28, 170 may be configured (e.g., shaped, positioned in alignment, etc.) to automatically connect when the brake pad 20, such as when the brake pad 20 is inserted into the cavity 122. In some variants, inserting the brake pad 20 into the cavity 122 causes positive engagement of the connectors 28, 170. For example, the connector 170 may be integrally formed in the cavity 122 and aligned with the connector 28 such that the connectors 28, 170 are positively engaged when the backing plate 22 is inserted into the cavity 122. In some implementations, removal of the brake pad 20 from the cavity 122 causes disconnection of the connectors 28, 170.

In some configurations, the connector 170 may be connected to an actuator (not shown) that extends into the connector hole 126 such that the connector 170 of the calibration machine 100 is pushed into positive engagement with the connector 28 of the brake pad 20 through the connector hole 126. The actuator may retract such that the connector 170 of the calibration machine 100 disengages with the connector 28 of the brake pad 20. In various embodiments, retraction of the connector 170 does not cause damage to the connectors 28, 170. The actuator may be controlled by the controller 160 such that connection of data from the pressure sensors 26 of the brake pad 20 to the calibration machine 100 may be fully automated. This can increase production efficiency and/or volume. The calibration machine 100 can be configured to quickly and safely connect to the connector 28 on the brake pad 20 once it is positioned within the cavity 122 at the beginning of the calibration data determining process 200.

The connector 170 can be configured to accommodate and/or engage with different types (e.g., sizes and configurations) of the brake pad 20. Different types of the pad 20 can be required due to, for example, the size and characteristics of the vehicle on the pad is to be used. For example, an instance of the pad 20 for use on a compact passenger car may be a different type than an instance of the brake pad 20 for use on a heavy truck. In some implementations, the connector 170 can move within the machine 100. For example, the connector 170 can be configured to move in x, y, and/or z directions relative to the base 110. This can permit the connector 170 to accommodate and/or engage with various types of the brake pad 20, and thus can enable the machine 100 to be used with a wide variety of the brake pad 20. This can reduce or avoid the need to make time-consuming changes to the manufacturing line due to a change in the type of brake pad 20 being produced. In some embodiments, the movement of the connector 170 is automated, such as by the controller instructing one or more motors to move the connector 170 to a certain position based on the type of brake pad 20.

In some embodiments, the connector 170 can change its orientation. For example, in some implementations, the connector 170 can rotate relative to the base 110, such as about a generally vertical axis of rotation. In some variants, the connector 170 can rotate by at least about: 45°, 90°, 135°, 180°, or otherwise. In some implementations, the machine 100 is configured to change the connector 170 from a generally vertical orientation to a generally horizontal orientation.

In some variants, the connector 170 is adapted to reduce the chance of damage during engagement with the pad 20. For example, the connector 170 can include damped pins that engage with the pad 20. In case of wrong positioning of the pad into the calibration machine, such damped pins can reduce or avoid mechanical damage or disruption during the calibration process.

Actuator(s)

With reference to FIG. 4A again, the illustrated calibration machine 100 includes a linear actuator 130. The actuator 130 can be controlled by the controller 160. Similar to the discussion above regarding the connector 170, the actuator 130 can be configured to adjust to accommodate a wide variety of configurations of the brake pad 20. For example, the actuator 130 can be configured to move in x, y, and/or z directions relative to the base 110.

The actuator 130 can apply pressure to the brake pad 20. In certain embodiments, the actuator 130 is supported at an angle relative to the brake pad 20. This can enable the actuator 130 to apply normal and shear forces to the friction material 24 of the brake pad 20. The normal and shear forces applied by the actuator 130 can simulate (e.g., be substantially identical to) the pressures experienced by the brake pad 20 during a braking application on a vehicle. The shear or tangential pressure applied to the friction material 24 of the brake pad 20 is analogous and/or equivalent to the braking torque applied to the friction material 24 of the brake pad 20 by the brake rotor of the vehicle. The normal pressure applied by the actuator 130 is analogous and/or equivalent to the force applied by the brake caliper 12.

The actuator 130 may include a cylinder 132 and a rod 134. The rod 134 moves relative to the cylinder 132 such that the actuator 130 extends and retracts in substantially a straight line. In the configuration shown in FIG. 4A, the actuator 130 is supported at a first end by the support pillar 150 which is attached to the base 110. In some embodiments, the actuator 130 is held fixed by a pinned connection with the support pillar 150. The actuator 130 is attached to a pressure plate 140 at a second end. The actuator 130 may be attached to the pressure plate 140 by a pivoting hub 142 and a load pin 144. The pressure plate 140 contacts the friction material 24 of the brake pad 20 such that the pressure plate 140 applies a pressure to the friction material 24 when the actuator 130 extends. The load pin 144 allows the pressure plate 140 to rotate relative to the actuator 130 such that the pressure plate 140 contacts the surface 36 of the friction material 24 such that the pressures are substantially evenly distributed across the surface 36 of the friction material 24. Preferably, the pressure plate 140 is configured (e.g., sized) to contact substantially the entire surface 36 of the friction material 24.

In some implementations, the actuator 130 is connected to an energizing unit, such as a compressor 136 that is controlled by the controller 160. The compressor 136 may compress hydraulic fluid or pneumatic gas to increase pressure within the cylinder 132 such that the rod 134 extends and applies pressure to the brake pad 20. The compressor 136 is capable of quickly and accurately providing the actuator 130 with sustained pressures of at least 5 bars to 150 bars for at least several seconds. Preferably, the actuator 130 provides pressure at an accuracy of at least 5% for lower pressures (e.g., less than 25 bars) and 2-3% for higher pressures (e.g., greater than 25 bars) in order to have similar accuracy in the calibration data of the brake pad 20. Other types of energizing units are contemplated. For example, certain embodiments include an electromechanical actuator such as an endless screw rotated by an electric motor. Some embodiments include non-linear actuators. Pressure may be applied to the friction material 24 of the brake pad 20 by a variety of mechanical and/or electromechanical mechanisms.

In some configurations, the actuator 130 has a stroke of sufficient length such that the pressure plate 140 may be moved a distance far enough away from the brake pad 20 to provide clearance such that the brake pad 20 may be easily installed and removed within the brake pad retainer 120. In some configurations, the actuator 130 and/or the compressor 136 may be equipped with a relief valve such that the hydraulic pressure of oil (or gas) within the actuator 130 may be quickly removed, released and/or bled. Release of the hydraulic pressure causes the rod 134 to quickly retract within the cylinder 132 such that the pressure plate 140 is quickly moved away from the brake pad 20. In yet another configuration, the support pillar 150 may include a tilting or rotating mechanism to move or rotate the actuator 130 away from the brake pad 20 such that the brake pad retainer 120 may be quickly and easily removed and inserted. In some configurations, the calibration machine 100 may provide alternative means for providing clearance between the brake pad retainer 120 and the pressure plate 140 such that the brake pad 20 may be removed from the brake pad retainer 120.

During the calibration data determining process 200, the brake pad 20 may be calibrated at several measuring points of varying magnitudes of applied pressure. For example, in some configurations, the outputs of the pressure sensors 26 may be measured at four measuring points of applied pressures of 5, 53.3, 101.6, 150 bars. The magnitude of each applied pressure $P_i$ is determined according to the following equation (e.g., assuming a range of pressures between 5 and 150 bars):

$$P_i = 5 + (i-1) * \frac{145}{N-1}$$

Where:
$P_i$=the magnitude of each applied pressure;
i=an index of the specific measuring point; and
N=the total number of measuring points to be taken during the calibration.

Preferably, the brake pad 20 is calibrated at a minimum of 4 points and a maximum of 10 points. It should be understood to one of ordinary skill in the art that the calibration machine 100 is not limited to applied pressures of 1-150 bars and 4-10 measuring points. In some configurations, the applied pressure may be applied and varied according to predetermined pressure-time curves.

In some configurations, the actuator 130 applies the normal and shear forces to the friction element 14 of the brake pad for a duration of 1-10 seconds. The applied pressure at each measuring point can be held generally constant for a duration of about 1-10 seconds. In some variants, the brake pad 20 may be held under constant pressure while the magnitude of the applied pressure changes. For example, the applied pressure may increase between sustained applied pressures of 5, 53.3, 101.6, 150 bars. The increasing or decreasing of the applied pressure may be varied to test the pressure sensor's dynamic response.

In some embodiments, the machine 100 is configured to conduct compressibility testing on the brake pad 20. Compressibility testing can aid in detecting defects in the brake pad 20, such as defects that may have been created during the manufacturing process (e.g., during the heat-treatment and/or curing process). In various embodiments, the machine 100 can be configured to conduct compressibility testing on each brake pad 20 tested. This can provide for 100% inspection of the brake pads 20 being produced, which can be an improvement over quality control methods that involve testing only samples and using statistical predictions.

Figure 4B:
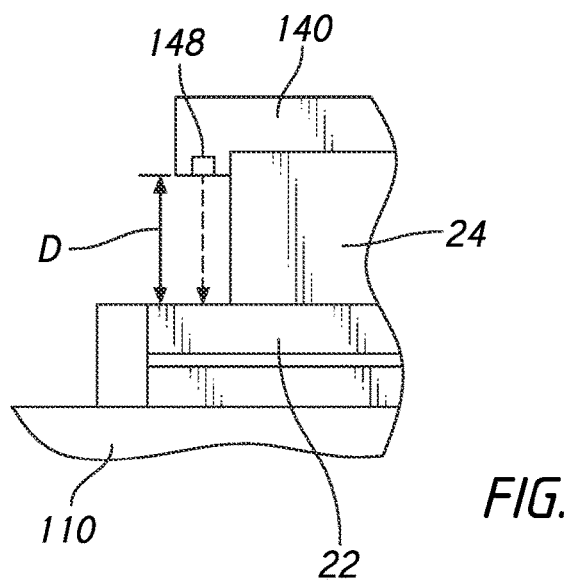
FIG. 4B is a close-up view of a portion of FIG. 4A and illustrates an example of a measuring system.

In some embodiments, the machine 100 tests compressibility using a measurement system that is configured to monitor a distance, such as the thickness of the pad 20. In some implementations, the measurement system includes a proximity sensor 148, such as a laser distance sensor, that is configured to measure the distance. For example, as shown in FIG. 4B, the proximity sensor 148 can be positioned on the pressure plate 140 and can measure a distance D between the pressure plate 140 and the backing plate 22, retainer 120, or base 110. In some embodiments, the distance is monitored during at least a portion of the calibration process. For example, as the distance can be monitored as the actuator 130 applies load (e.g., varying amounts of load) to the brake pad 20. The resulting distance data can be provided to the controller and/or can be used to determine deflection of the brake pad 20. The deflection of the brake pad 20 can be compared with certain values, such as minimum and maximum acceptable amounts, to determine whether the brake pad 20 is within acceptable quality control limits.

Support Pillar

In the configuration shown in FIG. 4A, the actuator 130 is attached to the base 110 by a support pillar 150. The support pillar 150 can be attached to the base 110 at one end and the actuator 130 at an opposite end. The support pillar 150 holds and supports the actuator 140 in alignment over the base 110 and the brake pad retainer 120. The support pillar 150 may house hydraulic lines, pneumatic lines and/or wires that connect the actuator 130, the compressor 136 and the controller 160 to each other.

The actuator 130 may be connected to the support pillar 150 by an angle adjustment mechanism (not shown). The angle adjustment mechanism can be configured to adjust an angle θ between the actuator 130 and a plane formed by a brake rotor contacting surface 36 of the friction material 24 upon which the pressure is applied. In some embodiments, as shown in FIG. 4A, the actuator 130 and the surface 36 of the friction material 24 form the angle θ. The angle θ can be determined according to a relationship between the pressure and frictional pressures to be simulated (e.g., to mimic those experienced by the brake pad 20 when mounted in the vehicle). In some embodiments, the ratio between normal forces (e.g., corresponding to the compressive pressure applied by the calipers) and the shear forces (e.g., corresponding to the friction pressures from engagement with the rotor) is substantially similar to the dynamic friction coefficient μ of the brake pad 20. The coefficient of friction can be thought of as the ratio between the force necessary to move one surface horizontally over another and the pressure between the two surfaces. Generally, the value of the dynamic friction coefficient μ is a known coefficient based on, for example, the design of the brake pad 20 and the chosen friction material 24. Accordingly, the angle θ of the actuator 130 may be determined using the following equation:

$$\mu = \frac{F_t}{F_N} = \tan\theta$$

Where:
μ=the dynamic friction coefficient;
$F_t$=the shear or tangential force;
$F_N$=the normal force; and
θ=the angle between the actuator 130 and a plane formed by a surface 36 of the friction material 24 upon which the force is applied.

Pressure can be determined by multiplying the force by the area of the friction material 24 that is in contact with the pressure plate 140. Applying the shear and normal forces at the angle θ enables the calibration machine to apply substantially identical pressures during the calibration data determining process 200 as experienced by the brake pad 20 during actual braking applications. For example, the angle θ can be adjusted so that the ratio of the shear force (e.g., the generally horizontal component of force) and the normal force (e.g., the generally vertical component of force) applied to the brake pad 20 is approximately equal to the coefficient of friction. Failing to achieve a condition similar to the friction coefficient in terms of the above pressure ratio may generate erroneous calibration data for the brake pad 20 because the brake pad 20 may experience different pressures than those during actual braking applications of the vehicle. Certain implementations include measuring a static friction coefficient, which is used as a reasonably close approximation for the dynamic friction coefficient. In some implementations, the static friction coefficient is greater than the dynamic friction coefficient by less than or equal to about 10%.

The angle adjustment mechanism allows the angle θ to be adjusted. Some embodiments are configured to adjust within typically a range of 50-80 degrees relative to plane formed by the surface 36 of the friction material 24. In some variants, the angle θ is at least about 68.2 degrees. The angle adjustment mechanism may include a mechanical angle adjustment structure for varying and fixing the angle θ between the actuator 130 and the surface 36 of the friction material 24. For example, the angle adjustment structure may include a mechanical feature for raising or lowering the support column 150 relative to the base 110 such that the angle θ increases or decreases. In some variants, the support column 150 may move laterally relative to the base 110 to adjust the angle θ. In some configurations, the angle adjustment mechanism may allow the actuator 130 to be angled relative to the surface 36 of the friction material 24 such that the actuator 130 is non-orthogonal to the surface 36 of the friction material 24. For example, the angle adjustment mechanism may include features that enable moving of the support column 150 laterally (e.g., left or right relative to FIG. 4A) and transverse (into or out of the page relative to FIG. 4A). In some configurations, the support column 150 may tilt such that the angle θ between the actuator 130 and the support column 150 may be adjusted. As mentioned above, the angle θ can facilitate simulating a coefficient of friction. For example, the angle θ can be adjusted such that the ratio of the generally horizontal component of the force applied by the actuator 130 and the generally vertical component of the force applied by the actuator 130 is approximately equal to the coefficient of friction. In some embodiments, the coefficient of friction is between about 0.3 and about 0.6. Preferably, the coefficient of friction is between about 0.4 and about 0.5, such as 0.42 or 0.43.

In some configurations, the base 110 may have a mounting system. The mounting system can include flanges, pillars and/or guides to mount the support pillar 150 to the base 110. In some configurations, the base 110 may include adjustment mechanisms to allow the position and/or angle of the support pillar 150 to be adjusted such that the angle of the piston 140 relative to the base 110 and brake pad retainer 120 may be adjusted. For example, the base 110 may have guides that allow adjustment of the support pillar 150. The support pillar 150 may be fastened to the guides by blocking nuts which lock the angle and/or position of the support pillar 150 relative to the base 110. The mechanical components, such as the guides and blocking nuts, can provide strength for structural stability and durability. This can be achieved, for example, by structural dimensioning the components and/or by choosing high duty stainless steel materials with a high degree of mechanical resistance.

It should be understood to one of ordinary skill in the art that the calibration machine 100 is not limited to the angle adjustment mechanisms described and may incorporate any means for adjusting and maintaining the angle between the actuator 130 and the surface 36 of the friction material 24. For example, in some configurations, the angle θ may be adjusted by varying the position of the brake pad 20 relative to the actuator 130.

Load Cells

In some configurations, the calibration machine 100 has pressure sensing features adapted to sense an absolute pressure, such as load cells, shear sensors, or pressure measuring devices. The load cells can be configured to measure the normal and/or shear forces applied by the actuator 130 to the brake pad 20 during the calibration data determining process 200. The load cells allow the normal and shear forces to be monitored to ensure that the calibration machine 100 is operating normally. In some embodiments, the load cells sense the angle θ and/or are used to determine the angle θ between the actuator 130 and the support column 150. This can aid in ensuring that the actuator 130 is positioned at the correct angle.

In certain configurations, a load cell may be installed between the end of the rod 134 of the actuator 130 and the pressure plate 140. For example, the load pin 144 may comprise a pressure sensor or strain gauge that is used to measure pressures along the X- and Y-axes. In certain implementations, the load pin 144 allows the normal and shear forces applied to the brake pad 20 to be measured while also allowing rotation of the pressure plate 140 relative to the actuator 130. In some variants, the load pin 144 may sense and measure the angle θ formed between the actuator 130 and the pressure plate 140.

In certain configurations, a load cell or a plurality of load cells may be positioned between the base 110 and the brake pad retainer 120, between the actuator 130 and the support column 150, integrated within the brake pad retainer 120 and/or integrated within the actuator 130. It should be understood to one of ordinary skill in the art that the load cells are not limited by position, type or quantity such that the calibration machine 100 may accurately measure pressures applied to the braking pad 20 by the actuator 130 before, during, and after the calibration data determining process 200.

Controller

The controller 160 can be configured to control operation of the calibration machine 100. In some embodiments, the controller 160 is connected to the actuator 130 and/or the compressor 136 to control the calibration data determining process 200. The controller 160 can be connected to the brake pad 20 and/or to the load cells such that the pressures exerted by the actuator 130 may be monitored. Some configurations include a user interface through which the calibration data determining process 200 may be monitored and manually controlled by a user. The controller 160 is connected to the pressure sensors 26 of the brake pad 20 via cables. However, in some configurations, the controller 160 may be wirelessly connected to the pressure sensors 26 of the brake pad 20.

The controller 160 comprises a processor and memory that are connected together and configured to perform the calibration data determining process 200. The processor can be any of a wide variety of processors, such as a microprocessor or other processor without limitation. The memory can be any of a wide variety of storage media, whether or not removable, and can include one or more arrays of RAM, ROM, EPROM, EEPROM, FLASH, and the like without limitation. The memory has stored therein a number of routines that are executable on the processor to cause the calibration machine 100 to perform the calibration data determining process 200. The controller 160 can be positioned in a control panel, which can be located on the calibration machine 100 or remotely.

In some configurations, the controller 160 is connected to a storage device in which the calibration data determined for each brake pad 20 by the calibration machine 100 is stored therein. Access to and retrieval of the calibration data may be provided via the internet, wired and/or wireless communication.

System Operation

Figure 6:
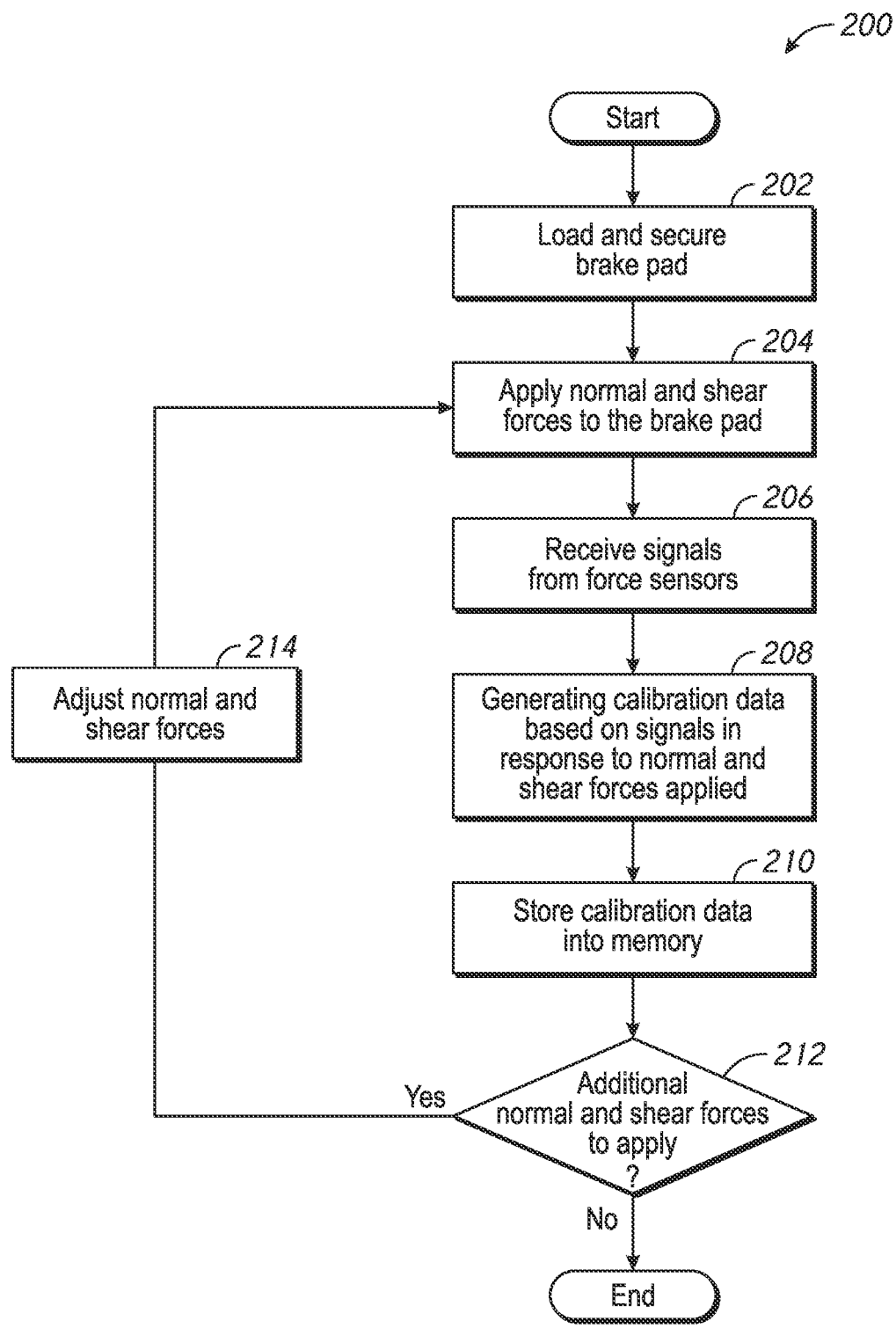
FIG. 6 is a flowchart illustrating a calibration data determining process.

An example of the calibration data determining process 200 is illustrated in FIG. 6. At block 202, the process 200 begins by loading and securing the brake pad 20 into the calibration machine 100. In some embodiments, the backing plate 22 of the brake pad 20 is inserted into the cavity 122 of the brake pad retainer 120. The brake pad 20 can be fixed, secured and/or fastened to the brake pad retainer 120 such that the brake pad 20 is inhibited from slipping or moving when the actuator 130 applies normal and shear forces to the brake pad 20. The connector 28 of the brake pad 20 can be connected to the connector 170 of the calibration machine 100. In some variants, signal outputs of the pressure sensors 26 are received by the controller 160. The brake pad 20 may be loaded into the calibration machine 100 manually by a user or automatically as part of an automated brake pad loading process. In some configurations, the calibration machine 100 may be positioned on an automated brake pad assembly line such that the brake pads 20 are automatically loaded into the calibration machine 100. In some implementations, the process 200 may be performed immediately following the final step of manufacturing.

At block 204, the calibration machine 100 applies pressure to the brake pad 20. In the illustrated configuration, the pressure plate 140 and the friction material 24 of the brake pad 20 are brought into contact. The actuator 130 can extend and/or press the pressure plate 140 against the friction material 24 of the brake pad 20. The brake pad 20 can be compressed between the pressure plate 140 and the brake pad retainer 120. The pressure can be substantially applied evenly across the surface 36 of the friction material 24. While the pressure is being applied by the actuator 130, the measurements from the load pin 144 may be monitored and/or compared with other actuator load measuring devices (e.g., hydraulic pressure, actuator pressure sensors, etc.) to verify that the actuator 130 is applying the correct amount of pressure to the brake pad 20.

At block 206, while the pressure is being applied to the brake pad 20, the outputted signals from the pressure sensors 26 of the brake pad 20 are received and/or recorded by the controller 160. For example, in the illustrated configuration, when the actuator 130 applies a pressure of 5 bars, the controller 160 can receive and/or record a signal from a pressure sensor 26 that measures a normal force and a signal from a pressure sensor 26 that measures shear force. For example, a signal indicative of about 15 mV for normal force and about 5 mV for shear force may be received. In various embodiments, the outputted signals from the pressure sensors 26 indicate that the normal and shear forces are received by the controller 160 via the connectors 28, 170.

At block 208, the controller 160 determines calibration data specific to the brake pad 20 based on the outputted signals from the pressure sensors 26 in response to the normal and shear forces applied to the brake pad 20. For example, in the illustrated configuration, the controller 160 determines calibration data based on the outputted voltages of 5 mV (shear) and 15 mV (normal) from the pressure sensors 26 at an applied pressure of 5 bars. Accordingly, when the brake pad 20 is installed on a vehicle and the processing unit 18 is provided with the calibration data, the processing unit 18 can determine that 5 bars of pressure is applied to the brake pad 20 when the pressure sensors 26 output voltages of 5 mV (shear) and 15 mV (normal).

At block 210, the calibration data specific to the brake pad 20 is stored into memory. In various embodiments, the calibration data is stored in a database. The calibration data may be uploaded from the database to the processing unit 18 of the vehicle. In some configurations, the calibration data may be stored in memory that is located on-board the brake pad 20. In some configurations, the processing unit 18 is provided with the calibration data when the brake pad 20 is installed on the vehicle.

At block 212, it is determined (e.g., by the controller 160) whether calibration data for additional measuring points (e.g., additional applied pressures) remain to be determined during the calibration data determining process 200. If calibration data for additional pressures has yet to be determined, the applied pressure is adjusted at block 214 and blocks 204 to 210 are repeated to determine calibration at the adjusted applied pressure. For example, in the illustrated configuration, after the calibration data has been obtained (e.g., determined) at an applied pressure of 5 bars, it is determined that additional calibration data is to be obtained at additional applied pressures (YES at block 212). In some embodiments, calibration data is to be additionally obtained (e.g., determined) at applied pressures of 53.3, 101.6 and 150 bars. Accordingly, at block 214, the applied pressure is adjusted to increase or decrease the normal and shear forces applied to the brake pad 20. Then, blocks 204 to 210 are repeated to obtained calibration data for each of the applied pressures of 53.3, 101.6 and 150 bars. If no further pressures remain to be tested (NO at block 212), the calibration data determining process 200 ends. For example, in the illustrated configuration, after calibration data has been obtained for applied pressures of 5, 53.3, 101.6 and 150 bars, it is determined at block 212 that no further pressures remain to be tested and thus, the calibration data determining process 200 ends.

In some configurations, if an abnormality or error is suspected or occurs during the calibration data determining process 200, it may also be determined whether blocks 204 to 210 should be repeated. Measuring points may be repeated to ensure and/or to validate the proper collection of calibration data.

Testing

Prior to and/or after the brake pad 20 is loaded into the calibration machine 100, the angle θ between the actuator 130 and the surface 36 of the friction material 24 may be verified and/or adjusted such that the pressure is applied at the correct angle to ensure that the correct normal and shear forces are applied to the brake pad 20. Periodically, the actuator 130 and pressure sensor in the load pin 144 may be tested to verify that the pressure measured by the load pin 144 is equal to the pressure output by the actuator 130. For example, the calibration machine 100 may have a load cell (e.g., in addition to the pressure sensor in the load pin 144), or can be used with "dummy" brake pads (e.g., test units that are similarly shaped to a brake pad and that incorporate one or more load cells), that provides absolute reference pressure measurements which is used to corroborate the pressure output by the actuator 130 and the pressure measured by the load pin 144. In operation, the actuator 130 may apply test pressures to the load cell and the pressure measurements from the pressure sensor in the load pin 144 are compared to the pressure measurements of the load cell to verify that the load pin 144 accurately measures pressure. Similarly, the measurements from the load cell may be compared to actuator pressure indicators such as hydraulic pressure, for example, to verify that the actuator 130 is outputting the precise amount of pressure. The calibration machine 100 may be tested periodically to ensure that the precise amount of pressure is being applied to the brake pads during the calibration data determining process 200.

In some configurations, the brake pads 20 may have an on-board processor and memory. Accordingly, the calibration machine 100 may be configured to determine calibration data such that the on-board processor of the brake pads 20 may be calibrated using the calibration data. In some embodiments, each brake pad 20 is calibrated such that the output of pressure sensors between substantially identically manufactured brake pads (e.g., same type and/or model) is substantially identical.

Another Example Calibration Machine

Figure 7:
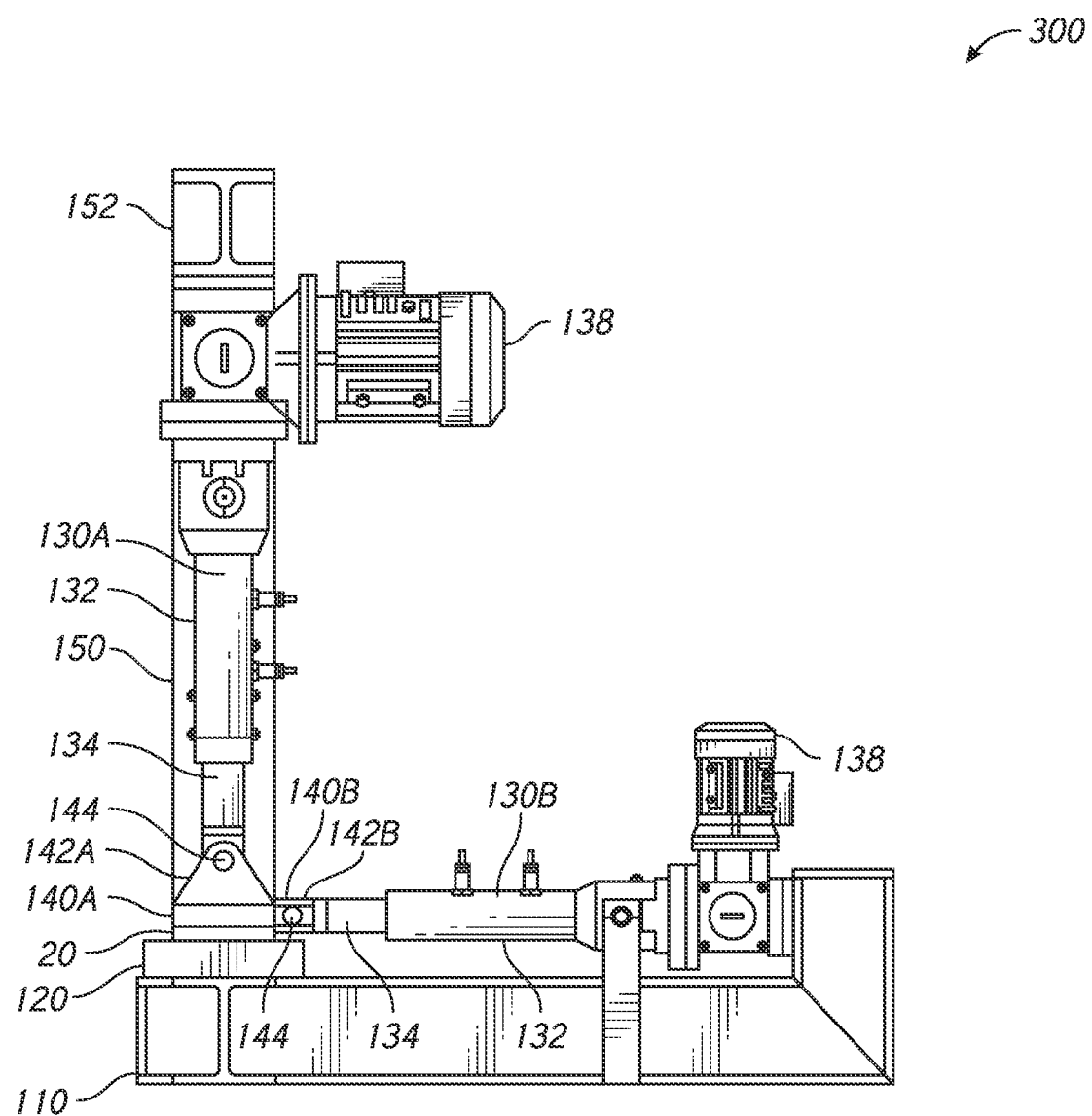
FIG. 7 illustrates a side view of another embodiment of a calibration machine.

FIG. 7 illustrates another embodiment of a calibration machine 300. In contrast to the calibration machine 100 in FIGS. 4A, 4B and 5, the calibration machine 300 includes a dual actuator arrangement such that the normal forces and shear forces are applied by separate actuators. In some embodiments, the normal force is applied by a first actuator and the shear force is applied by a second actuator. For the sake of brevity, the following disclosure will discuss features not already described in the above disclosure. The calibration machine 300 can include any of the features of the calibration machine 100.

The calibration machine 300 comprises a normal force actuator 130A that is positioned substantially perpendicular to the brake pad 20 and a shear force actuator 130B that is positioned substantially parallel to the brake pad 20. The normal force actuator 130A is positioned substantially parallel to a normal force direction of the brake rotor contacting surface 36 of the friction material 24 of the brake pad 20. The shear force actuator 130B is positioned substantially parallel to a shear force direction of the brake rotor contacting surface 36 of the friction material 24 of the brake pad 20. Accordingly, the normal force actuator 130A applies a normal force to the brake pad 20 and the shear force actuator 130B applies a shear or tangential force to the brake pad 20.

As discussed above, other types of actuators are contemplated, such as hydraulically- or pneumatically-actuated pistons.

In the illustrated configuration, the normal and shear force actuators 130A, 130B are comprised of electromechanical actuators. Accordingly, the normal and shear force actuators 130A, 130B are powered by electric motors 138 which are individually controlled by a controller (not shown). Accordingly, the normal and shear force actuators 130A, 130B are capable of being controlled and actuated independently such that the normal and shear forces applied to the brake pad 20 may be individually adjusted.

The ends of each of the normal and shear force actuators 130A, 130B are attached to the pressure plates 140A, 140B by hubs 142A, 142B, respectively. In some embodiments, the pressure plates 140A, 140B are attached to the end of the rod 134 of each actuator 130A, 130B by hubs 142A, 142B. The hubs 142A, 142B may be attached to the actuators 130A, 130B by load pins 144. The load pins 144 allow rotation of the hubs 142A, 142B relative to the actuators 130A, 130B. In some embodiments, the load pins 144 are configured to allow minimal adjustment of the pressure plates 140A, 140B and/or to ensure a good uniformity of the applied pressure from the pressure plates 140A, 140B to the friction material surface of the braking pad.

In the illustrated configuration, the pressure plates 140A, 140B are not fixed to each other. Rather, the pressure plate 140B contacts and presses against the pressure plate 140A. In some embodiments, a bottom surface of the pressure plate 140A (e.g., a surface opposite the normal force actuator 130A) contacts the surface 36 of the friction material 24 such that the normal force is generally uniformly distributed across the surface 36 of the friction material 24. Preferably, the pressure plate 140A contacts substantially the entire upper surface 36 of the friction material 24. The shear force actuator 130B extends such that the pressure plate 140B contacts a lateral perimeter portion of the pressure plate 140A (e.g., a surface of the pressure plate 140A that is perpendicular to the normal force direction). The shear force actuator 130B can extend such that the pressure plate 140B presses against the pressure plate 140A. Accordingly, a shear force is applied to the friction material 24 of the brake pad 20 via the pressure plate 140B applying a force to the pressure plate 140A in a direction perpendicular to the normal force.

In some embodiments, the separate normal and shear force actuators 130A, 130B enables the calibration machine 300 to conduct quality control testing. For example, in addition to determining calibration data, the calibration machine 300 is capable of conducting compressibility testing on the brake pad 20. As previously discussed, compressibility testing can test for defects in the brake pad 20 created during the manufacturing process. In some implementations, the normal force actuator applies a normal force onto the brake pad 20 to measure the variation in thickness of the friction material 24 as a function of the pressure applied. In certain embodiments, only a normal force is applied to the brake pad 20 and/or no shear force is applied with the actuator 130B. As mentioned above, testing the compressibility of the brake pad 20 can be an important parameter for validating the production of the brake pad, such as for validating that the heat-treatment and/or curing process was proper. In some implementations, the compressibility is performed with a laser unit. The laser unit can be placed on the pressure plate 140 on the side opposite of the shear force piston to measure, for instance, interferometrically the distance variation as a function of the applied pressure (compressibility).

In some embodiments, separate normal and shear force actuators 130A, 130B also enables the normal and shear forces to be individually varied during the calibration data determination process. In some embodiments, in contrast to a single actuator arrangement, the shear force may be increased or decreased without varying the normal force (or vice versa) and/or without requiring adjustment of the angle of the actuator.

Another Example Calibration Machine

Figure 8:
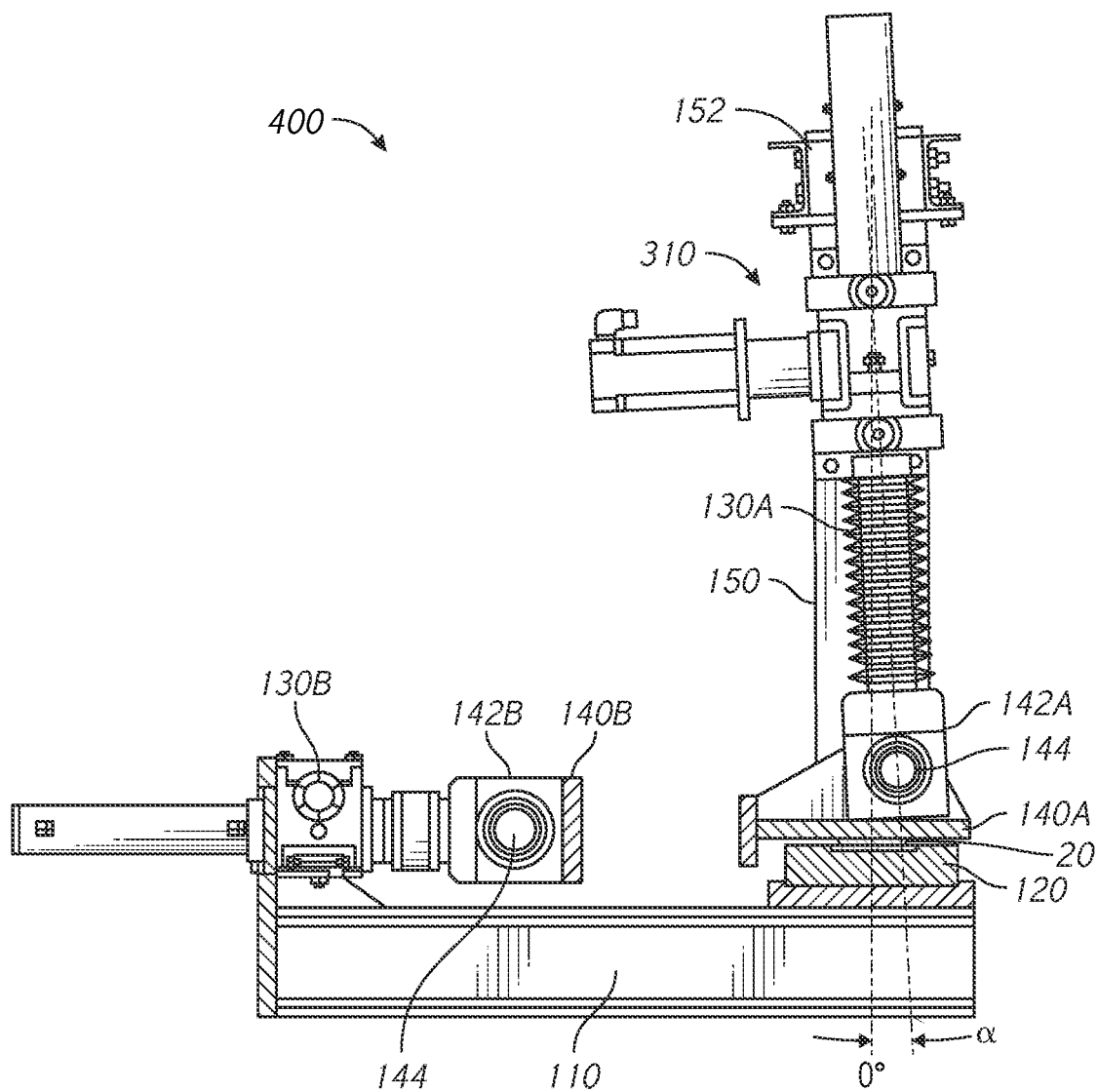
FIG. 8 illustrates a front cross-sectional view of another calibration machine with an actuator angle adjustment mechanism.
Figure 9:
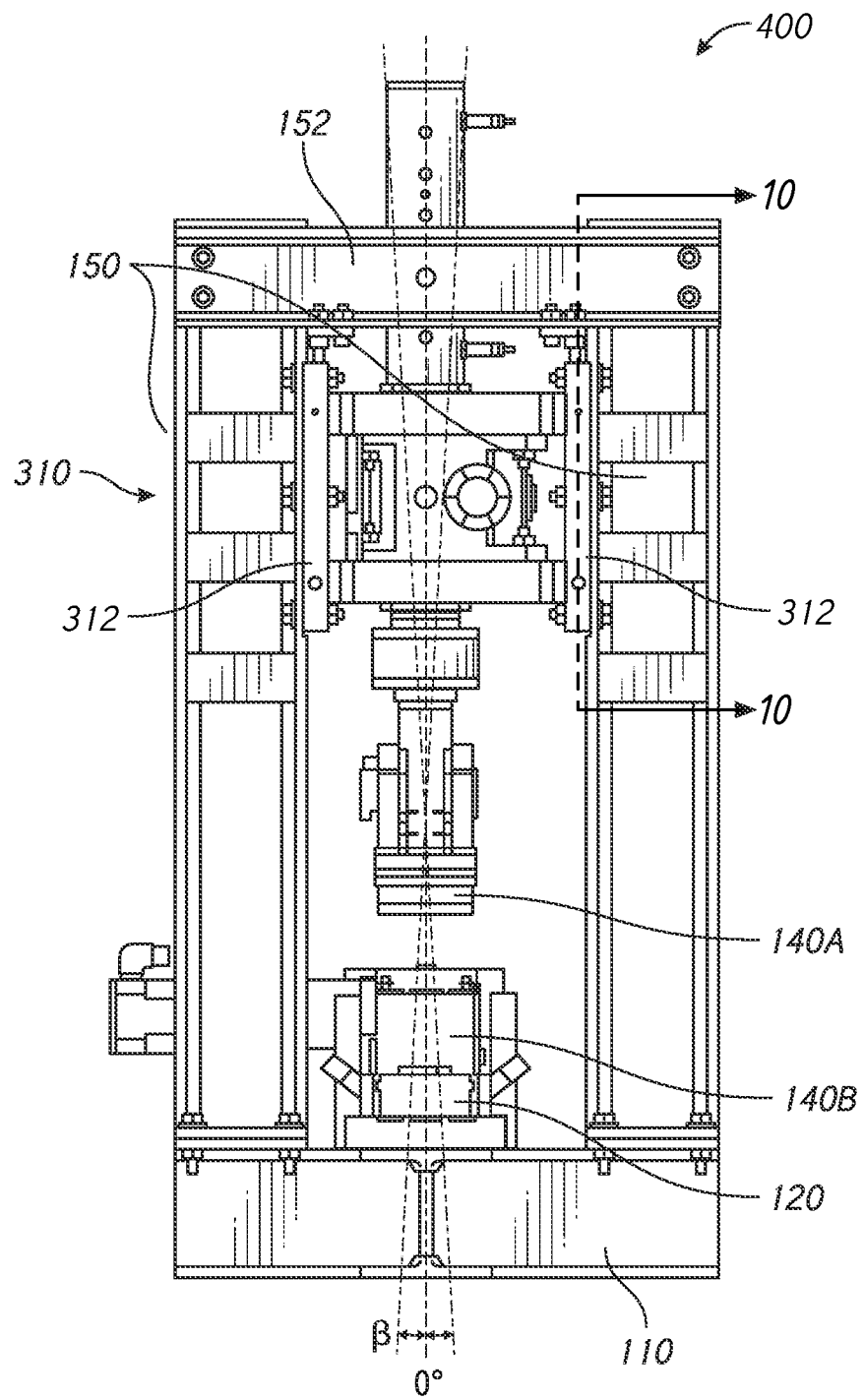
FIG. 9 illustrates a side view of the calibration machine of FIG. 8.
Figure 10:
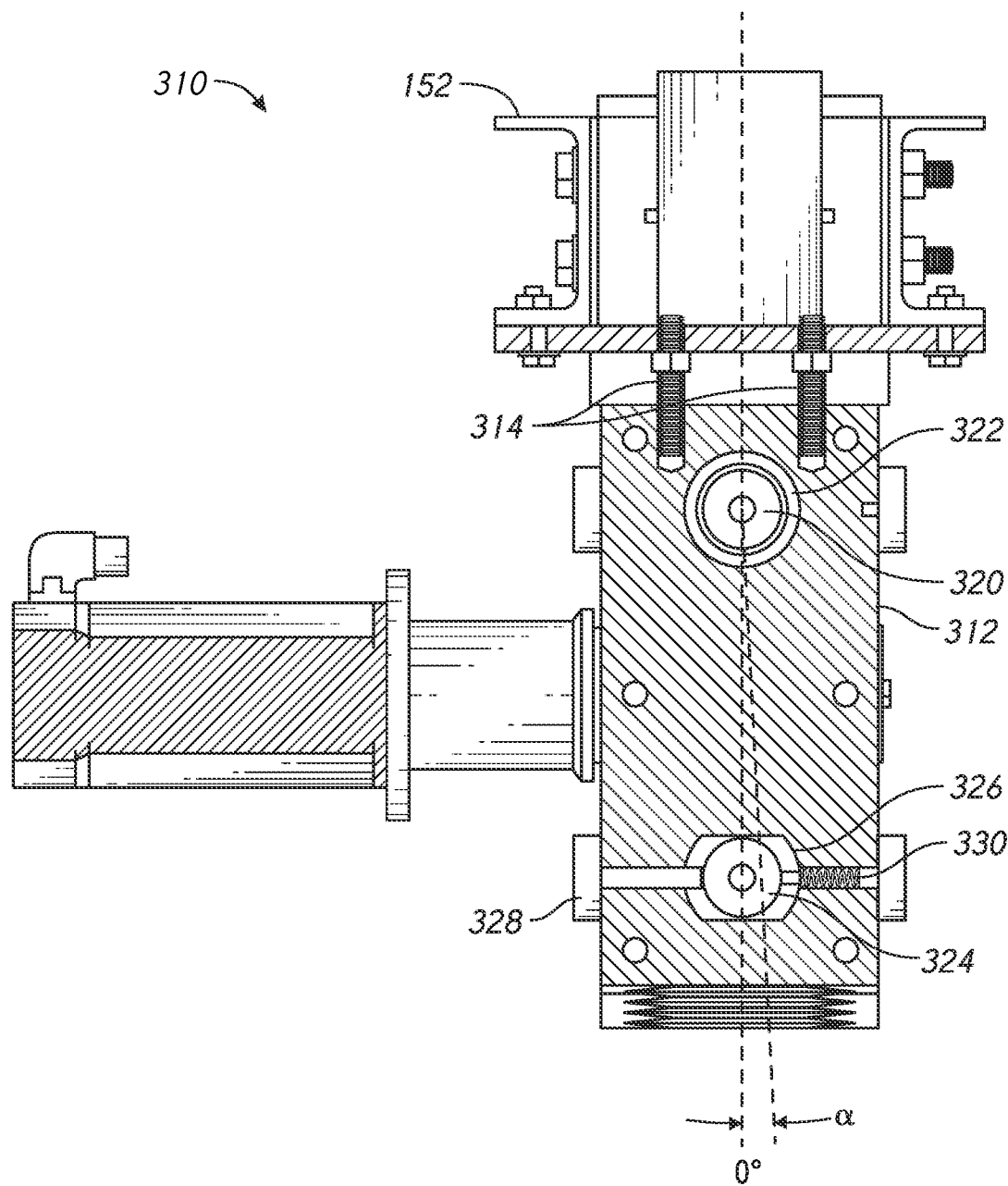
FIG. 10 illustrates a close-up front cross-sectional view along a line 10-10 in FIG. 9 of the actuator angle adjustment mechanism of the calibration machine of FIG. 8.

FIGS. 8-13 illustrate another calibration machine 400. The calibration machine 400 can be a modified version of the calibration machine 300. The calibration machine 400 can include any feature of the calibration machine 100 and/or the calibration machine 300. In some embodiments, the calibration machine 400 is mountable on surfaces that are slightly uneven (e.g., on surfaces that are not perfectly level). As shown in FIGS. 8 and 9, the calibration machine 400 has an actuator angle adjustment mechanism 310 that allows the angles α and β of the normal force actuator 130A to be adjusted relative to the direction of the support column 150, which is perpendicular to a surface of the base 110. Accordingly, the actuator angle adjustment mechanism 310 allows the normal force actuator 130A to be adjusted, such as to account for a grade of the surface on which the calibration machine 400 is mounted. For the sake of brevity, the following disclosure will discuss features not already described in the above disclosure.

FIGS. 8-11 illustrate an example of the actuator angle adjustment mechanism 310. In various embodiments, the mechanism 310 allows the angle α of the normal force actuator 130A to be adjusted in the relative to the direction of the support column 150. As shown, the calibration machine 300 has support columns 150 supported by a base 110. The support columns 150 support opposing ends of a support beam 152. The normal force actuator 130A is attached to actuator mounting supports 312 on opposing sides. The actuator mounting supports 312 can be planar plates formed from a rigid material such as metal. An upper end of the normal force actuator 130A can be attached to the actuator mounting supports 312 on opposing sides by upper journal ends 320. In some embodiments, each upper journal ends 320 may be received within a bearing 322 housed in the actuator mounting supports 312. The upper journal ends 320 can engage the bearings 322 to allow rotation of the normal force actuator 130A about the upper journal ends 322. In some embodiments, the bearings 322 comprise roller bearings, but may include other types of friction reducing mechanisms.

A lower end of the normal force actuator 130A is attached to the actuator mounting supports 312 on opposing sides by lower journal ends 324. Each lower journal end 324 may be received within a slot 326 in the actuator mounting supports 312. The lower journal ends 320 have a diameter that is similar to the width of the slot 326. However, the slot 326 has a length that is greater than the diameter of the lower journal ends 320. Accordingly, the lower journal ends 320 may slide within the slot 326 along the length of the slot 326. Sliding of the lower journal ends 320 within the slot 326 allows the angle of the normal force actuator 130A to be adjusted relative to the direction of the support column 152. In some embodiments, the slot 326 has a length that allows at least 3 degrees of adjustment of the normal force actuator 130A. The position of the lower journal ends 320 within the slot 326 may be secured by an adjustment bolt 328 and a biasing spring 330. In some embodiments, the adjustment bolt 328 may engage one side of the lower journal end 320 while a biasing spring 330 presses against the opposing side of the lower journal end 320 such that the position of the lower journal ends 320 within the slot 326 is fixed. In some variants, adjustment bolts may be positioned and engage opposing sides of the lower journal end 320 such that the position of the lower journal ends 320 within the slot 326 is fixed.

Figure 11:
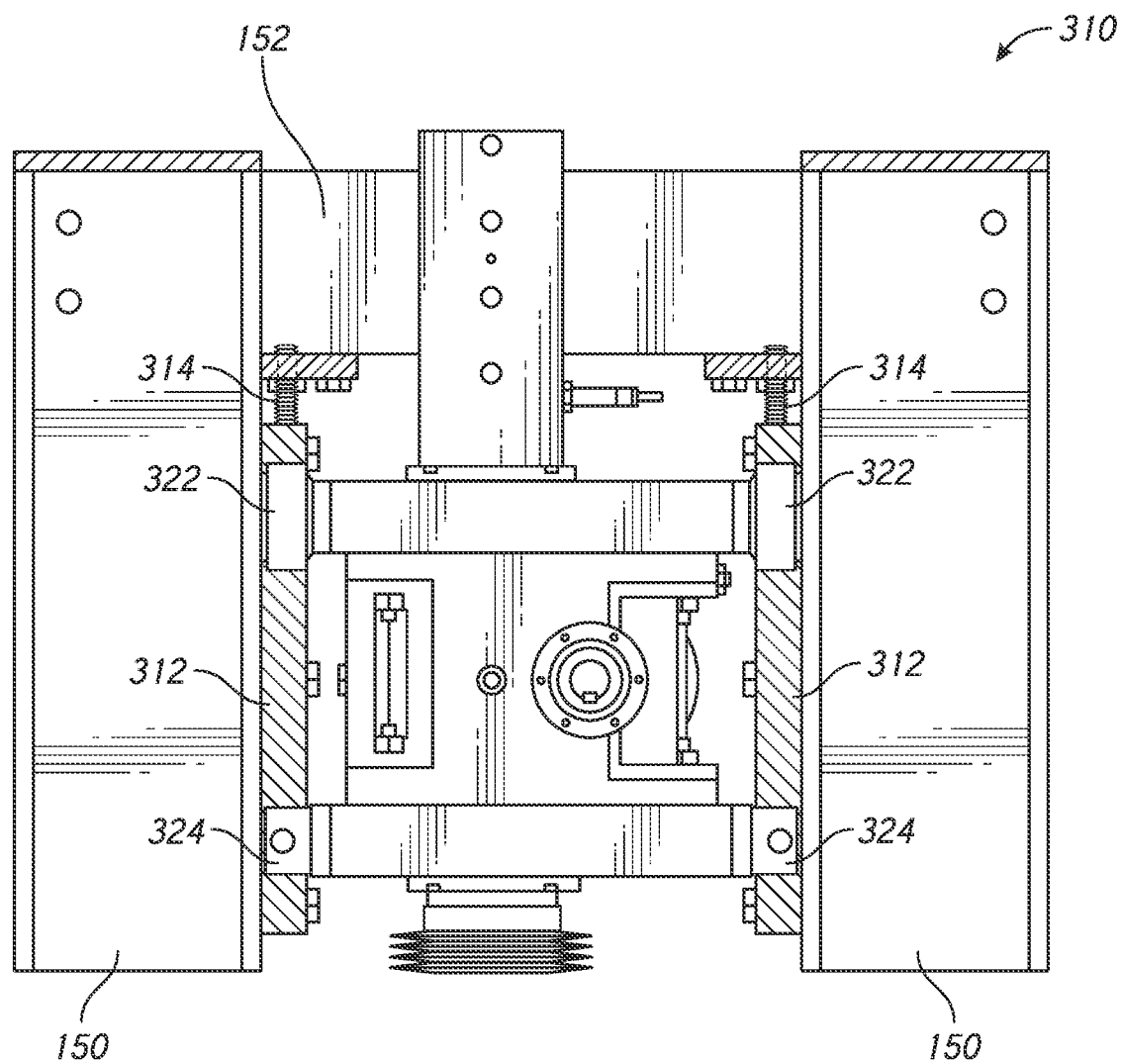
FIG. 11 illustrates a close-up side cross-sectional view of the actuator angle adjustment mechanism of the calibration machine of FIG. 8.

FIGS. 9 and 11 illustrate the actuator angle adjustment mechanism 310 that allows the angle β of the normal force actuator 130A to be adjusted relative to the direction of the support column 152. As shown, the actuator mounting supports 312 are supported by the support beam 152 by adjustment studs 314. A first end of each adjustment stud 314 is engaged with the support beam 152. A second end of each adjustment stud 314 is engaged to the support beam 152. The studs 314 can be threaded and comprise threaded rods or bolts. In some embodiments, rotation of the studs 314 increase or decrease the distance between the support beam 152 and the actuator mounting supports 312. As such, the distance between the support beam 152 and the actuator mounting supports 312 at opposing ends of the normal force actuator 130A may be varied such that the angle of the normal force actuators 130A may be adjusted relative to the base 110.

Figure 12:
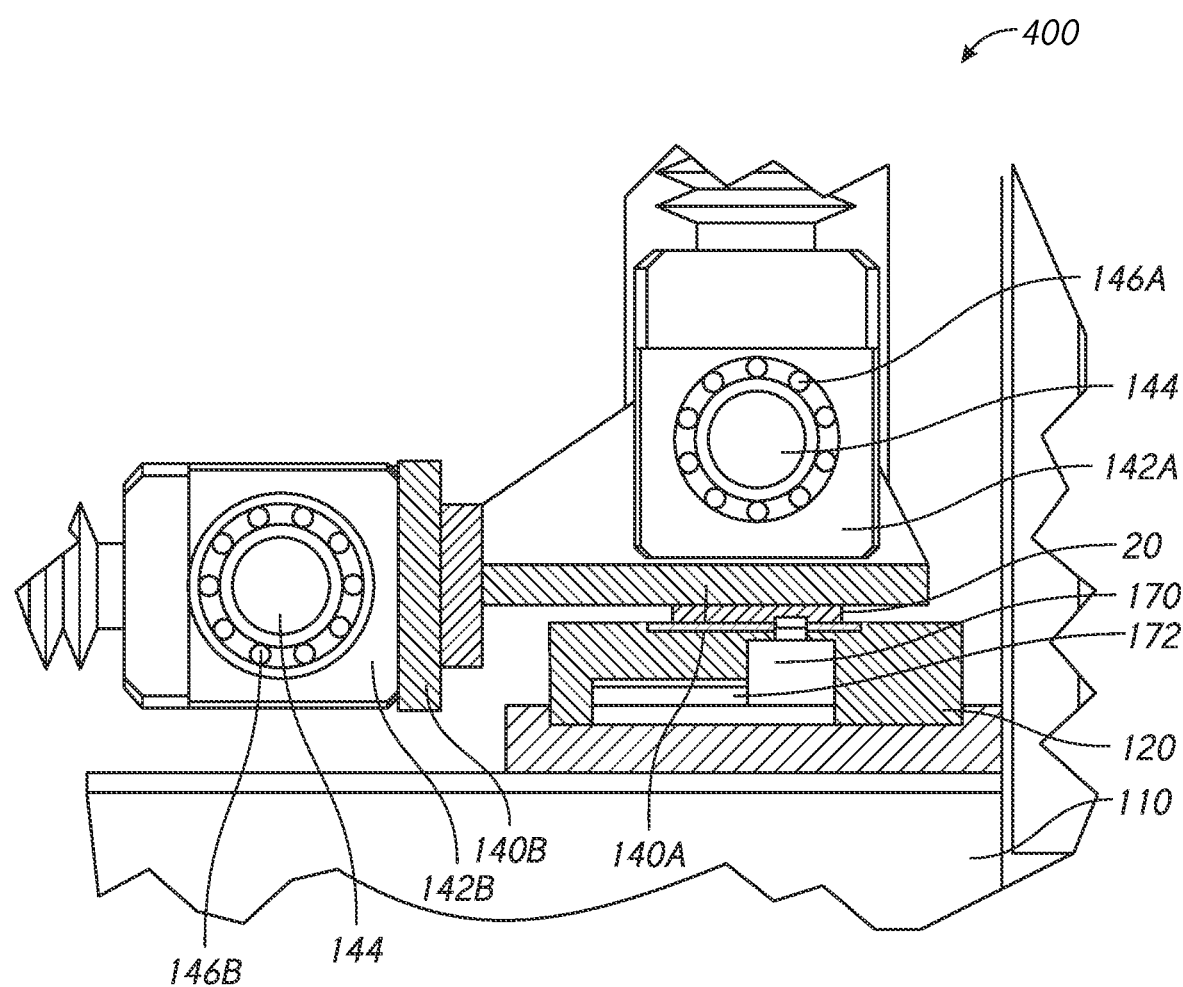
FIG. 12 illustrates a close-up front cross-sectional view of the calibration machine of FIG. 8.

FIG. 12 is a close-up cross-sectional side view of the calibration machine 400 in which the pressure plates 140A, 140B are engaging the brake pad 20. As shown, the brake pad 20 is secured within the brake pad retainer 120 and the connector 170 is connected to the connector 28 of the brake pad 20. The connector 170 can be connected to a cable 172 such that the signals from the pressure sensors 26 in the brake pad 20 can be routed to and received by the controller (not shown). In the illustrated configurations, the load pins 144 for each of the hubs 142A, 142B have bearings 146A, 146B. The bearings 146A, 146B reduce the friction between the load pins 144 and the hubs 142A, 142B which prevent the uneven application of force onto the brake pad 20. In the illustrated configuration, the bearings 146A, 146B are comprised of ball bearings but may include other types of bearing and friction reducing mechanisms. In various embodiments, when the normal force actuator 130A is adjusted relative to the direction of the support column 152, the bearings 146A, 146B allow rotation of the hubs 142A, 142B and the pressure plates 140A, 140B to accommodate for a difference in angle between a friction material engagement surface of the pressure plate 140A and the surface 36 of the friction material 24 of the brake pad 20. In certain implementations, the bearings 146A, 146B allow the pressure plates 140A, 140B to rotate relative to the hubs 142A, 142B and to substantially uniformly engage the friction material 24 of the brake pad 20 when the angle of the normal force actuator 130A is adjusted relative to the direction of the support column 152. In some embodiments, the bearings 146A, 146B are placed on the actuator hub joining the actuator with the respective pressure plates 140A, 140B. The bearings 146A, 146B can allow minimal adjustment and/or can ensure a substantial uniformity of the applied pressure to the friction material surface of the brake pad 20. In some embodiments, one or both of the bearings 146A, 146B is used to remove from the shear forces any contribution coming from the actuator or friction between the plates 140A, 140B.

Figure 13:
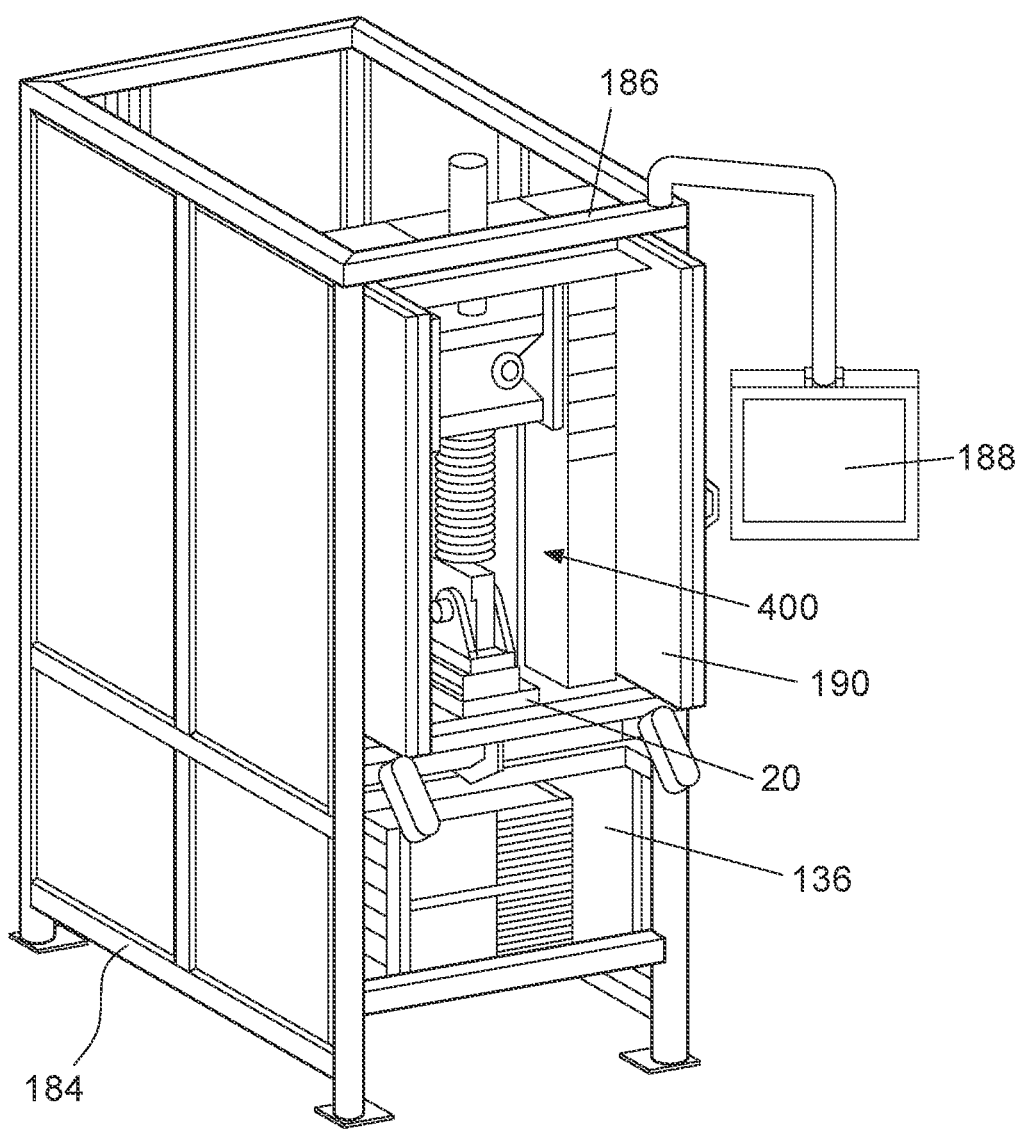
FIG. 13 illustrates a cage enclosing the calibration machine of FIG. 8.

As shown in FIG. 13, the calibration machine 400 can be enclosed for safety, such as in a cage 184. For example, the calibration machine 400 can be surrounded by the cage 184 on at least 4 sides. As shown, the calibration machine 400 can include a control panel 186, which can include the controller 160. The cage 184 can include a screen 188 that displays operational information about the calibration machine, such as the applied pressure, time, sensor readings, etc. The cage 184 includes one or more doors 190 that are used to open and close the cage 184 to allow loading and unloading of the brake pad 20, as well as closing the cage 184 for the calibration testing. As shown, in some embodiments, the cage 184 houses the compressor 136.

An Example Torque-Based Calibration Machine

Certain embodiments of this disclosure are configured to apply an actual torque to the brake pad, rather than simulating a torque with a shear force. Applying an actual torque to the brake pad can enable the calibration machine to more closely simulate (e.g., be substantially identical to) the forces that the brake pad 20 experiences when the brake pad 20 is pressed against a spinning brake rotor of a vehicle. This can increase the accuracy of the calibration data provided by the calibration machine.

Figure 14:
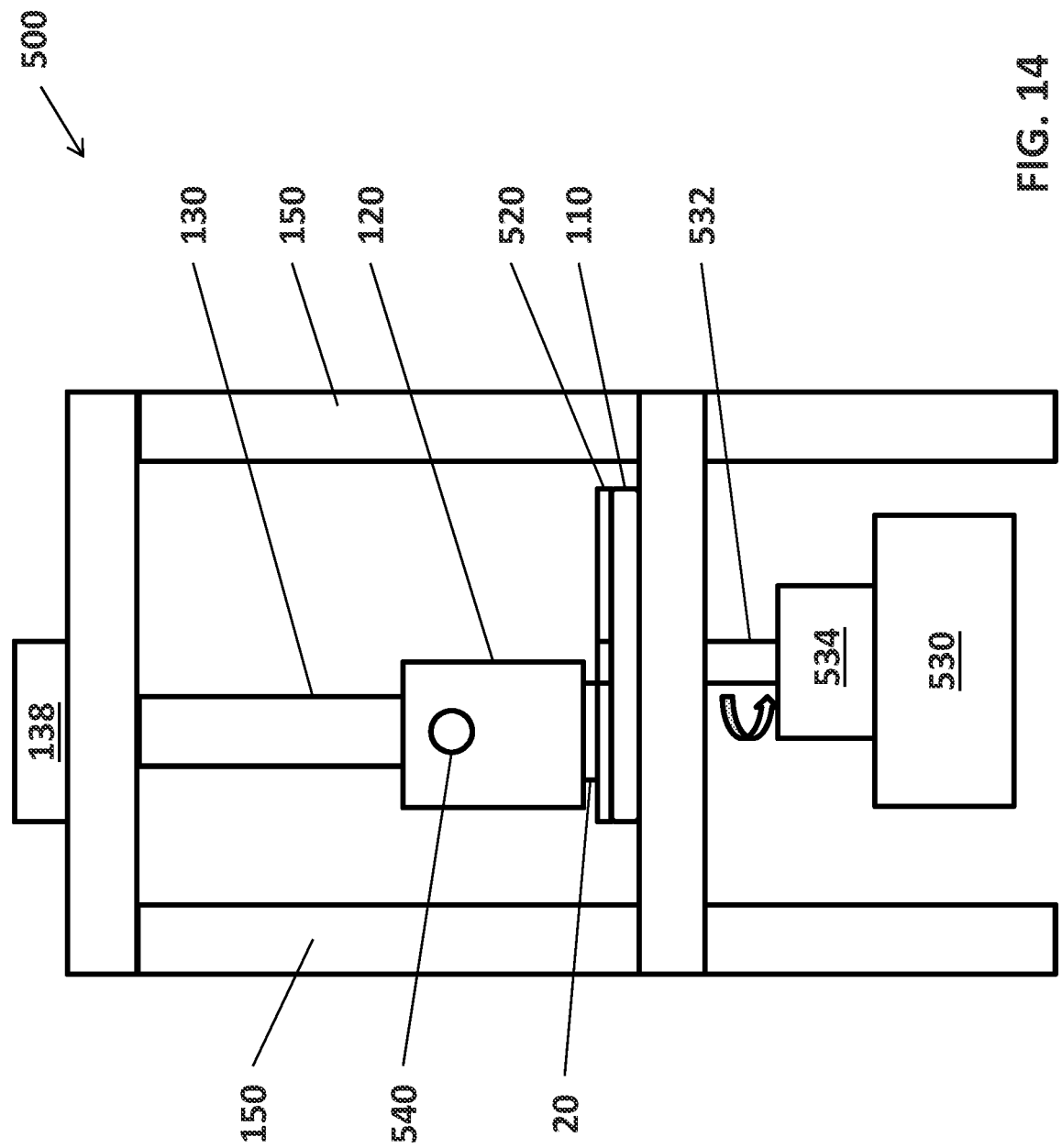
FIG. 14 illustrates a side view of an embodiment of a torque-based calibration machine.

FIG. 14 illustrates an example of a torque-based calibration machine 500. In various embodiments, the calibration machine 500 is configured to apply a normal force and a torque to the friction material 24 of a sensorized brake pad 20. As illustrated, the machine 500 can include a fixture or base 110, a brake pad retainer 120, and support columns 150. The machine 500 can include a normal force actuator 130 (e.g., a piston) and an actuator motor 138 (e.g., an electric motor). The actuator motor 138 may comprise an electromechanical actuator such as an endless screw rotated by the actuator motor 138, however a variety of other mechanical and/or electromechanical mechanisms may be used. Some embodiments include non-linear actuators. The actuator motor 138 can drive the normal force actuator 130 to apply a normal force to the friction material 24 of the brake pad 20. The actuator motor 138 can be controlled and actuated by the controller. The normal force actuator 130 and the actuator motor 138 can be comprised in a normal force assembly of the machine 500.

The normal force actuator 130 can press the brake pad 20 against a platen 520, such as a disk. The platen 520 can be configured to at least partially rotate. In some embodiments, a motor 530 rotates and/or applies a torque to the platen 520. As illustrated, in certain implementations, the platen 520 is coupled to an axle 532, which is coupled to a gear reduction mechanism 534, which is coupled to the motor 530. The motor 530 can be controlled by the controller. In some embodiments, the motor 530 applies the torque to the platen 520 after the normal force actuator 130 has pressed the brake pad 20 against the platen 520. In certain variants, the frictional force between the brake pad 20 and the platen 520 can inhibit or prevent the platen 520 from rotating relative to the brake pad 20. The platen 520 and the motor 530 can be comprised in a torque assembly of the machine 500.

In some embodiments, the machine 500 includes a sensor, such as a shear load cell or a torque sensor. For example, the axle 532 may comprise the sensor. The sensor can be configured to detect the torque being applied to the platen 520, such as during some or all of the calibration data determining process 200. Certain embodiments include a sensor, such as a load cell, for detecting the normal force being applied by the normal force actuator 130. Several embodiments include a normal force sensor and a torque or shear force sensor. As previously described, the brake pad 20 can include normal and/or shear sensors.

As mentioned above, the machine 500 can include the gear reduction mechanism 534. In some embodiments, the gear reduction mechanism 534 changes (e.g., increases) the torque that is output by the drive motor 530. This can enable the calibration machine 500 to apply torque to the platen 520 without being limited by the torque capacity or limits of the drive motor 530. The gear reduction mechanism 534 may comprise, for example, a planetary gearset that multiplies the torque that is output by the drive motor 530 by a gear ratio provided by the planetary gearset. The drive motor 530 is not limiting and other torque generating mechanisms may be used. For example, in other configurations, the torque may be applied to the platen 520 by a linear actuator that rotates the axle 532 via lever arm.

The platen 520 can be configured to simulate (e.g., be substantially identical to) the brake rotor that the brake pad 20 would contact when installed on the vehicle. For example, the platen 520 can be made of the same material as and/or have a coefficient of friction that is about the same as the brake rotor. In some implementations, the platen 520 is formed from steel, cast iron, or another metal. The platen 520 may be removable from the calibration machine 500, such as by being unsecured from the base 110. Removability can allow the platen 520 to be replaced when worn, or to be interchanged with a different platen 520 that corresponds to a different model or type of brake rotor that the brake pad 20 is to be used with when installed on a vehicle. This enables the calibration machine 500 to generate calibration data for a variety of brake pads 20 with a variety of brake rotors.

Similar to the previous discussion, the brake pad 20 can be retained and secured within the brake pad retainer 120. The brake pad 20 can be connected to the controller via a connector (not shown) within the brake pad retainer 120. Data from the pressure sensors 26 of the brake pad 20 can be received by the controller. The brake pad retainer 120 may be connected to the normal force actuator 130 by an adjustment mechanism 540. This can, in some embodiments, allow the orientation of the brake pad retainer 120 relative to the platen 520 to be adjusted such that the brake pad 20 contacts the platen 520 substantially square and/or evenly across the surface of the friction material 24. The adjustment mechanism 540 can comprise, for example, a lockable spherical bearing or the like. In some configurations, the adjustment mechanism 540 can include the normal force sensor. As previously discussed, the brake pad retainer 120 can include a laser unit to measure the compressibility of the brake pad 20.

During the calibration data determining process 200, the normal force actuator 130 presses the brake pad 20 against the platen 520. The friction material 24 of the brake pad 20 contacts and is pressed against the platen 520 such that a normal force is applied to the platen 520. The platen 520 is supported by the fixture 110 on a side opposite of the brake pad 20 such that the platen 520 is sandwiched between the friction material 24 of the brake pad 20 and the fixture 110 when the normal force is applied to the brake pad 20. During a portion of the time during which the normal force is applied, the drive motor 530 applies a torque to the platen 520, thereby applying a shear force to the friction material 24 of the brake pad 20 while the normal force is applied. During at least this time, data from the sensors of the brake pad 20 can be received by the controller for use in producing the calibration data for that brake pad.

In some implementations, during some or all of the calibration data determining process 200, the platen 520 is held substantially stationary (relative to the brake pad 20 and/or the actuator 130) by a frictional engagement between the brake pad 20. In certain variants, the platen 520 is held substantially stationary when the ratio of the shear force and the normal force is less than the static friction coefficient μ of the brake pad 20. This is expressed by the following:

$$\frac{F_t}{F_N} < \mu_s$$

Where:
$\mu_s$=the static friction coefficient;
$F_t$=the shear or tangential force;
$F_N$=the normal force; and
The shear force $F_t$ may be derived from the following equation:

$$F_t = \frac{\tau}{2R}$$

Where:
τ=the torque applied to the platen 520; and
R=the effective radius of the brake pad 20 relative to the platen 520.

Preferably, the normal force actuator 130 can apply a normal force or pressure, for example, within the range of 1 to 180 bars, which is similar to the range of pressures applied to the brake pad 20 by the brake caliper during a braking application. The drive motor 530 via the gear reduction mechanism 534 may apply a torque, such as at least about for example, within a range of 6,000 Nm to 10,000 Nm, which is similar to the range of braking torque applied experienced by the brake pad 20 during an emergency braking application.

Certain Terminology

Although certain calibration machines, systems, and processes have been disclosed in the context of certain example embodiments, it will be understood by those skilled in the art that the scope of this disclosure extends beyond the specifically disclosed embodiments to other alternative embodiments and/or uses of the embodiments and certain modifications and equivalents thereof. Use with any structure is expressly within the scope of this invention. Various features and aspects of the disclosed embodiments can be combined with or substituted for one another in order to form varying modes of the assembly. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Terms of orientation used herein, such as "top," "bottom," "proximal," "distal," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Some embodiments have been described in connection with the accompanying drawings. The figures are to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

Summary

Various illustrative embodiments of calibration machines, systems, and methods have been disclosed. Although the machines, systems, and methods have been disclosed in the context of those embodiments, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

The following is claimed:

1. A brake pad calibration machine, comprising:
   a fixture;
   a brake pad retainer supported by the fixture and configured to hold a sensorized brake pad relative to the fixture;
   an actuator supported by the fixture, the actuator controllable to apply force to the sensorized brake pad, and the calibration machine adjustable to adjust an angle θ between a force direction of the actuator and a plane formed by a surface of a friction element of the sensorized brake pad; and
   a controller configured to:
      control the actuator to apply force to the sensorized brake pad in the force direction to apply both normal and shear forces to the surface of the friction element of the sensorized brake pad; and
      receive one or more signals from one or more force sensors of the sensorized brake pad when the force is applied to the sensorized brake pad; and
      generate calibration data based on the signals received from the force sensors when the force is applied to the sensorized brake pad.

2. The machine of claim 1, wherein the controller is further configured to monitor a thickness of friction material of the brake pad during application of the normal and shear forces.

3. The machine of claim 2, wherein the controller is further configured to store the calibration data in a memory.

4. The machine of claim 3, wherein the memory is on-board the sensorized brake pad.

5. The machine of claim 1, wherein the machine comprises an electrical connector configured to engage with an electrical connector of the sensorized brake pad.

6. The machine of claim 5, wherein the controller is further configured to cause movement of the electrical connector of the calibration machine into engagement with the electrical connector of the sensorized brake pad.

7. The machine of claim 1, further comprising a second actuator supported by the fixture, the controller configured to control the second actuator to apply a force to the sensorized brake pad in a second force direction.

8. The machine of claim 7, wherein the second force direction is tangential to the surface of the friction element of the sensorized brake pad.

9. The machine of claim 1, wherein the controller is configured to control the actuator such that a ratio of the shear force to the normal force is less than a static coefficient of friction of the friction element of the brake pad.

10. The machine of claim 1, wherein the controller is configured to control the actuator such that a ratio of the shear force over the normal force is equal to about tan θ.

11. The machine of claim 1, wherein the controller is further configured to move the actuator to adjust the angle θ.

12. The machine of claim 1, wherein the force sensors comprise a normal sensor and a shear sensor.

13. A brake pad calibration machine comprising:
    a fixture;
    a brake pad retainer supported by the fixture and configured to hold a sensorized brake pad relative to the fixture;
    a first actuator supported by the fixture and configured to apply a first force to the sensorized brake pad in a force direction of the first actuator at a first angle formed between the force direction of the first actuator and a plane formed by a surface of a friction element of the sensorized brake; and
    a second actuator supported by the fixture and configured to apply a second force to the sensorized brake pad in a force direction of the second actuator at a second angle formed between the force direction of the second actuator and the plane formed by the surface of the friction element, the second angle different than the first angle; and a controller configured to:
- control the first actuator to apply force to the sensorized brake pad in the force direction of the first actuator to apply force to the friction element of the sensorized brake pad;
- control the second actuator to apply force to the sensorized brake pad in the force direction of the second actuator to apply force to the friction element of the sensorized brake pad;
- receive one or more signals from one or more force sensors of the sensorized brake pad when the force is applied to the sensorized brake pad; and
- generate calibration data based on the signals received from the force sensors when the force is applied to the sensorized brake pad.

14. The machine of claim 13, wherein the controller is further configured to store the calibration data in a memory.

15. The machine of claim 14, wherein the memory is on-board the sensorized brake pad.

16. The machine of claim 13, wherein the machine comprises an electrical connector configured to engage with an electrical connector of the sensorized brake pad.

17. The machine of claim 13, wherein the first actuator is controllable to adjust the first angle.

18. The machine of claim 13, wherein the second angle is tangential to the surface of the friction element.

19. The machine of claim 13, wherein the one or more force sensors comprise a normal sensor and a shear sensor.

20. The machine of claim 13, wherein the first angle is normal to the surface of the friction element and the second angle is tangential to the surface of the friction element.

* * * * *